(12) United States Patent
Williams et al.

(10) Patent No.: US 7,925,514 B2
(45) Date of Patent: *Apr. 12, 2011

(54) SYSTEMS AND METHODS FOR CREATING ON-DEMAND ROUTES FOR POWERED INDUSTRIAL VEHICLES

(75) Inventors: David E. Williams, Stafford, VA (US); Stephen J. McElroy, Manassas, VA (US)

(73) Assignee: United States Postal Service, Washington, DC (US)

( * ) Notice: Subject to any disclaimer, the term of this patent is extended or adjusted under 35 U.S.C. 154(b) by 1260 days.

This patent is subject to a terminal disclaimer.

(21) Appl. No.: 11/416,614

(22) Filed: May 3, 2006

(65) Prior Publication Data

US 2007/0198174 A1 Aug. 23, 2007

Related U.S. Application Data

(60) Provisional application No. 60/775,440, filed on Feb. 21, 2006.

(51) Int. Cl.
*G06Q 10/00* (2006.01)
(52) U.S. Cl. ......................................................... 705/1.1
(58) Field of Classification Search .................... 705/1.1
See application file for complete search history.

(56) References Cited

U.S. PATENT DOCUMENTS

| | | | |
|---|---|---|---|
| 5,260,694 A | 11/1993 | Remahl | |
| 5,995,888 A | 11/1999 | Hagenbuch | |
| 6,026,378 A | 2/2000 | Onozaki | |
| 6,700,507 B2 | 3/2004 | Jones | |
| 6,768,944 B2 | 7/2004 | Breed et al. | |
| 7,034,683 B2 | 4/2006 | Ghazarian | |
| 7,183,666 B2 | 2/2007 | Arakawa et al. | |
| 7,202,776 B2 | 4/2007 | Breed | |
| 7,273,172 B2 | 9/2007 | Olsen, III et al. | |
| 2002/0059075 A1 | 5/2002 | Schick et al. | |
| 2002/0072923 A1 | 6/2002 | Guidry | |
| 2002/0089434 A1 | 7/2002 | Ghazarian | |
| 2003/0069648 A1* | 4/2003 | Douglas et al. | 700/2 |
| 2003/0233189 A1 | 12/2003 | Hsiao et al. | |
| 2004/0204796 A1 | 10/2004 | Harvey et al. | |
| 2004/0236502 A1 | 11/2004 | Nozaki et al. | |

(Continued)

FOREIGN PATENT DOCUMENTS

EP  1467303 A2  10/2004

OTHER PUBLICATIONS

International Search Report from PCT/US06/17052, dated Aug. 31, 2007.

(Continued)

*Primary Examiner* — Jonathan Ouellette
(74) *Attorney, Agent, or Firm* — Knobbe Martens Olson & Bear LLP

(57) ABSTRACT

Systems and methods for creating in a facility on-demand routes for powered industrial vehicles to transport cargo efficiently. In one embodiment, an on-demand route generation module receives receiving a request to move cargo. The module analyzes data about the current location, the current tasking, and the driver availability of PIVs in operation. Based on the information, the module creates an on-demand route through the facility and sends a notification to an assigned PIV to pick up the cargo and carry it on the defined on-demand route.

39 Claims, 12 Drawing Sheets

U.S. PATENT DOCUMENTS

| | | |
|---|---|---|
| 2004/0251870 A1 | 12/2004 | Ueda et al. |
| 2004/0267595 A1 | 12/2004 | Woodings et al. |
| 2005/0047895 A1 | 3/2005 | Lert, Jr. |
| 2005/0137786 A1 | 6/2005 | Breed et al. |
| 2007/0067200 A1 | 3/2007 | Patel |
| 2007/0198175 A1 | 8/2007 | Williams et al. |
| 2007/0198282 A1 | 8/2007 | Williams et al. |

OTHER PUBLICATIONS

International Search Report from PCT/US06/17099, dated Feb. 25, 2008.

International Search Report from PCT/US06/17066, dated Aug. 29, 2007.

Supplementary European Search Report from EP 06752200, dated Jul. 15, 2010.

* cited by examiner

SYSTEMS AND METHODS FOR CREATING ON-DEMAND ROUTES FOR POWERED INDUSTRIAL VEHICLES

CROSS-REFERENCE TO RELATED APPLICATIONS

This application claims the benefit of U.S. Provisional Application No. 60/775,440, filed Feb. 21, 2006, the entire disclosure of which is incorporated by reference herein. This application is also related to the following applications filed concurrently herewith: (1) U.S. patent application Ser. No. 11/417,007, entitled "SYSTEMS AND METHODS FOR MANAGING POWERED INDUSTRIAL VEHICLES," and (2) U.S. patent application Ser. No. 11/417,009, entitled "SYSTEMS AND METHODS FOR CREATING ROUTES FOR POWERED INDUSTRIAL VEHICLES." Each of the above-referenced patent applications is hereby incorporated by reference herein.

BACKGROUND OF THE INVENTION

1. Field of the Invention

The invention relates to management of industrial vehicles. More particularly, the invention relates to management of such vehicles in environments such as facilities, including for example, plants, construction sites, warehouses, docks, airports, campus, and other specified mapped areas.

2. Description of the Related Art

In many cargo-handling environments such as warehousing environments, cargo is transported throughout a warehouse by powered industrial vehicles (PIVs). In larger warehouses, it is not uncommon for a more than one hundred PIVs to be operating within the warehouse at the same time. In these large warehouses, it is difficult to track the location of each PIV and to distribute the work load evenly among all PIVs, because it is difficult to ascertain the availability of a PIV at any given moment. Sometimes, a PIV may be constantly on the run throughout the day, carrying cargo from one location to the next. At the same time, other PIVs may be sitting idle with very little work to do.

Many factors can affect the utilization of a particular PIV. For example, if PIVs are assigned regular delivery routes, it may be that some routes are significantly busier than others. Moreover, some PIV operators may be more experienced and skilled than others, which results in dispatchers seeking to use these drivers as much as possible. Other factors affecting the utilization of PIVs may include the familiarity of the operator with the layout of the workspace in which he is operating. For example, in a large warehouse environment, drivers with superior knowledge of the warehouse environment may be able to reach delivery destinations more efficiently than those without that knowledge. The motivation of the operator of the PIV may also play a role in a PIV's rate of utilization. Some operators may be more motivated and may actively seek out additional work. Other operators may be less motivated, and fail to quickly return to a dispatch area to receive an additional assignment. Uneven usage of PIVs can lead to problems in scheduling maintenance (which often depends on utilization rate). Therefore, it would be a valuable improvement to provide a system in which utilization of PIVs can be evenly distributed among an entire fleet of PIVs to ensure balanced PIV workload capacity that meets dynamic workload demand profiles.

Existing schemes for managing PIV fleets also suffer from an inability to easily provide an operator of the PIV with information that may help the operator more effectively do his job. FIG. 1 provides a flowchart of a process that illustrates some of these difficulties. At block 1, cargo arrives at a facility for unloading by a PIV. At block 2, the PIV arrives at a loading dock in the facility. However, in order to accept a load from the inbound truck the PIV must be unassigned and not carrying cargo. Thus at decision block 3, the process determines whether the PIV is already assigned. If the PIV is not already assigned, the process proceeds to block 4, where the PIV picks up the cargo and destination assignment. The process then proceeds to block 5. If it was determined in block 3 that the PIV is already carrying cargo when it arrives at the loading dock, the process skips down to block 5.

At block 5, the PIV operator must determine whether he knows the location of the delivery destination for the cargo. Some warehouse environments may span 75 acres or more, so if the PIV operator does not know the location for delivery, he must first obtain this information in block 6 before the process then proceeds to block 7. If, in block 5, the PIV operator is familiar with the destination of the cargo, the process skips to block 7. At block 7, the PIV operator proceeds to the delivery destination. Unfortunately, in larger warehouses, the operator may not know the most direct route to his destination, so often times the chosen route is not an optimal route for traversing the facility. Next, at block 8, the PIV arrives at its destination and delivers its cargo. From that point, the PIV operator must return to the loading dock to receive another assignment.

The process shown in FIG. 1 is inefficient because the operator of the PIV does not have easy access to relevant data that may help him more efficiently operate the PIV. For example, upon delivering the cargo in block 8 of FIG. 1, there may be additional cargo at a nearby location that needs to be returned to the loading dock. However, in the system of in FIG. 1, the PIV must return to the loading dock to receive a dispatch assignment, and only then will it proceed to that new location to pickup the cargo.

Another problem associated with the operation of PIVs in existing warehousing environments stems from the difficulty associated with predicting PIV workloads in advance. Sometimes, unexpected shipments may arrive at the warehouse facility, leading to an unusually heavy volume of cargo that must be transported throughout the facility. These unanticipated spikes in arriving cargo tend to result in uneven utilization and inefficient scheduling of PIVs and their operators, as operators may need to be called in and work overtime to handle the unexpected spike in cargo volume.

Significant costs may also be incurred as a result of unauthorized or unlicensed operators taking control of PIVs and operating them unsafely. Moreover because PIVs may be dispatched for long periods of time, if a PIV is involved in an accident, it is very difficult to track when and where the accident occurred, or even who was responsible. Therefore it would be a valuable improvement to provide a system in which operators could be associated with PIVs and data could be collected regarding the operator's control of the PIV.

SUMMARY OF THE INVENTION

The system, method, and devices of the invention each have several aspects, no single one of which is solely responsible for its desirable attributes. Without limiting the scope of this invention, several of its features will now be discussed briefly.

In one embodiment, a networked PIV management system is provided. The system comprises a PIV analyzer module configured to determine PIV route data through a facility based on facility layout data, the facility layout data being electronically generated by a software mapping tool and the route data substantially comprising an optimal route between two points in the warehouse; a PIV dispatch management module configured to receive a request to transport a cargo from a first location to a second location in the warehouse, the PIV dispatch management module being further configured to receive route data from the PIV analyzer tool and select, based at least in part on the route data and a location of the first location, a PIV for transporting the cargo; and a surface visibility module configured to track the cargo after it is transferred from the first location to the second location by receiving scanned barcode data from the cargo via a scanner connected to the network.

In another embodiment, a computer-implemented method of managing the use of PIVs comprises receiving a request to transport cargo from a first location to a second location; selecting a PIV to carry out the request, the request being based on at least one of a current location of the PIV within the facility, the status of an operator of the PIV, and a maintenance schedule of the PIV. The method further includes sending a notification to the PIV about the request, the notification including a cargo identification code, a cargo location, a cargo destination, and an optimal route; and receiving an acknowledgement from the PIV of receipt of the notification.

In yet another embodiment, a method is provided for creating on-demand routes for PIVs. The method includes receiving a dispatch order for cargo which includes the current location of the cargo and the delivery point for the cargo. The method also provides for receiving location data, tasking data, driver availability data and battery charge data for some or all of the PIVs in operation. The method further provides for selecting based on the received data a PIV to pickup the cargo at the beginning location. Once the PIV has been selected, the system defines an on-demand route from the current location of the selected PIV to the location of the cargo and sends the route to the selected PIV.

BRIEF DESCRIPTION OF THE DRAWINGS

In this description, reference is made to the drawings wherein like parts are designated with like numerals throughout.

DETAILED DESCRIPTION OF EMBODIMENTS OF THE INVENTION

Various embodiments of the invention provide for a system and method for collecting interrelated data to achieve automation of the operation and management of PIVs in a cargo-handling environment.

Figure 1:
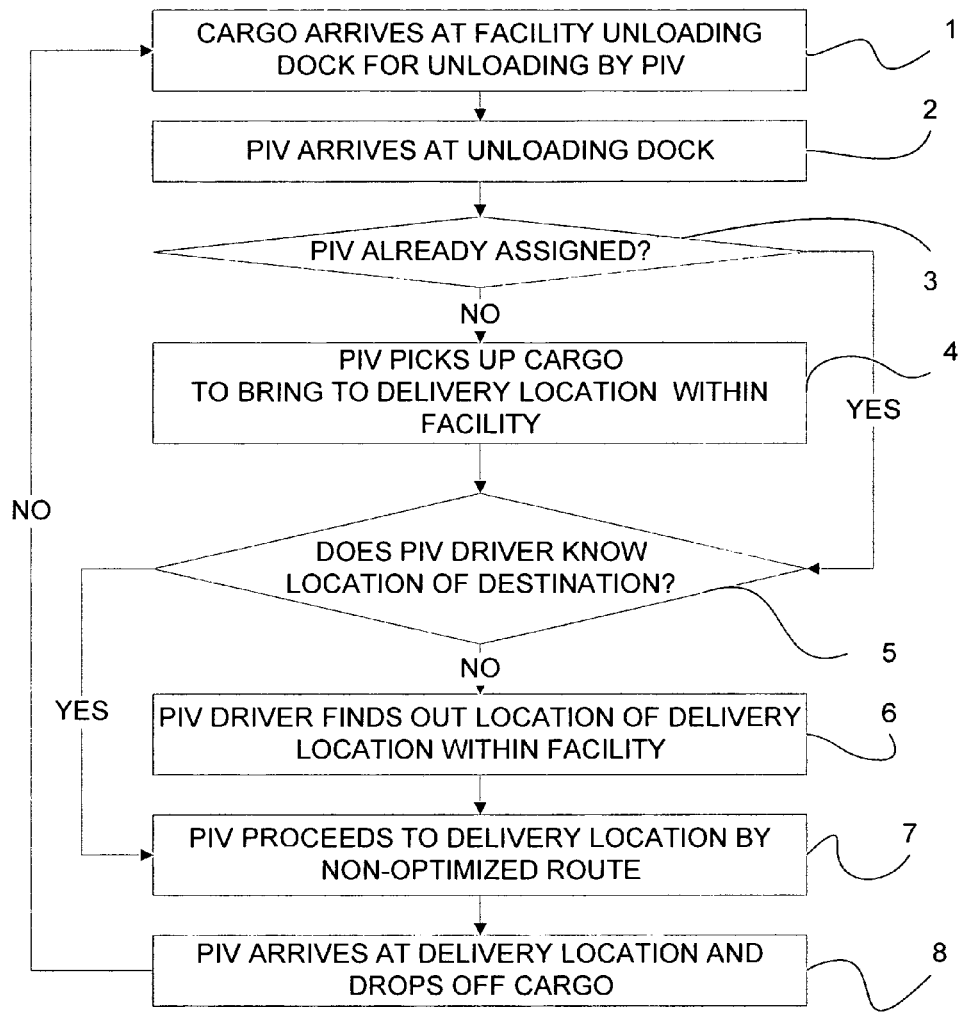
FIG. 1 is a flowchart illustrating an existing method for operating a PIV in a warehouse environment.
Figure 2:
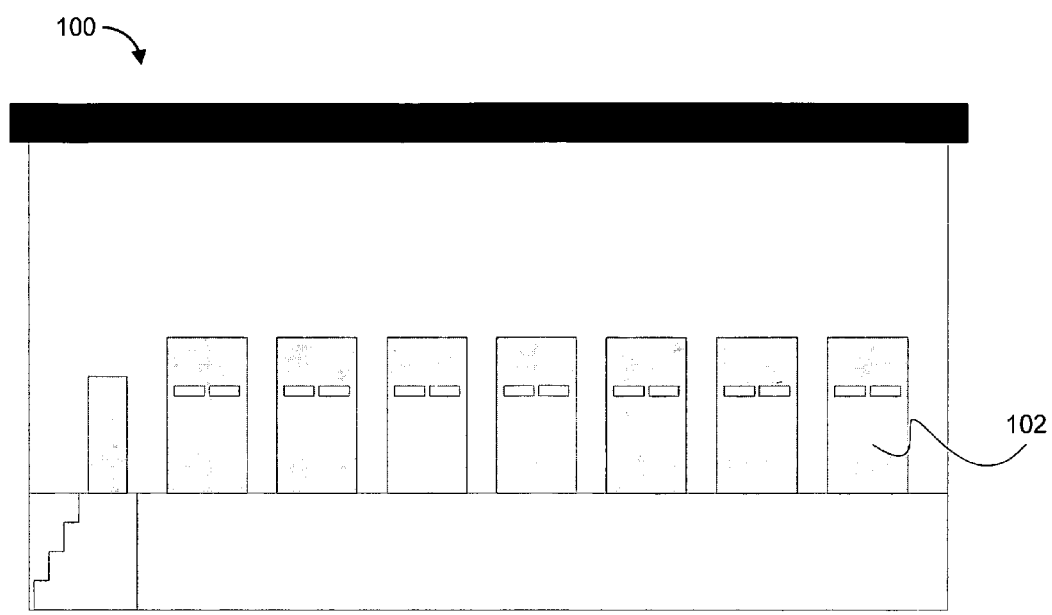
FIG. 2 is a front elevation view of a facility with a multi station loading dock.

Aspects of the invention may be practiced in various environments in which PIVs are utilized including, but not limited to, docks, hotels, campuses, airports, and warehouses. In an embodiment described herein, aspects of the invention may be implemented in a facility 100 as shown in FIG. 2. As noted above, the facility 100 may be any of a number of different types of operating environments in which PIVs are used for transporting materials between locations. By way of example and not of limitation, the facility 100 may be a fulfillment warehouse, a factory, a shipment facility, a mail processing facility, or some other facility in which PIVs are used to transport materials or cargo.

The facility 100 may include a loading dock 102. The loading dock 102 is a platform where vehicles such as trucks or trains can be loaded or unloaded. The loading dock 102 may be a raised platform that allows large trailers to be positioned in front of it so that the bed of a trailer is positioned at a similar height as the platform of the loading dock 102.

Figure 3:
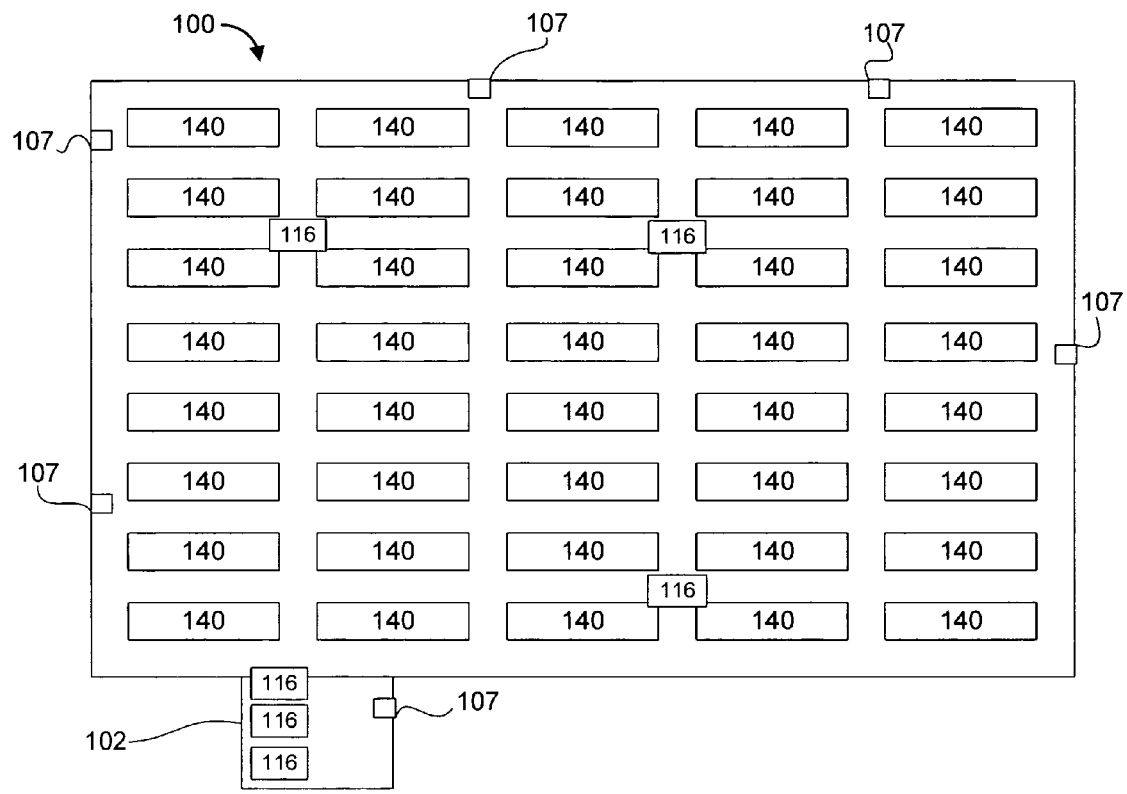
FIG. 3 is a block diagram providing an aerial view of the layout of a facility.

FIG. 3 provides an overhead view of the exemplary facility 100. The facility 100 may include one or more areas where cargo may be picked up or delivered. In one embodiment, such areas may be referred to as locations 140. A location 140, as used herein, refers to a machine location or area such as a processing area in the facility 100. In one embodiment, the facility 100 is a mail processing facility, in which locations 140 may include mail sorting devices which receive stacks of mail and sort them into various trays by scanning the parcels and categorizing them based on criteria such as class of mail, the final destination, routing information, or based on some other information. A location 140 may also be an incoming loading dock 102 or an outgoing loading dock 102. Cargo such as postal mail that enters the facility 100 may be routed to one or more locations within the facility 100 prior to being routed to the outgoing loading dock 102 for transportation to another facility on a trailer 104 (or some other transportation device), or to its ultimate destination.

The facility 100 may also include several radio frequency identification (RFID) scanners 107 positioned to provide scanning coverage to various areas of the facility. In one embodiment, the RFID scanners may be placed about fifty feet from one another to provide complete coverage of the facility. One of skill in the art will appreciate, however, that depending on the particular RFID scanning technology employed, this distance may be greater or less than fifty feet, and still provide complete coverage of the facility. In some embodiments, the RFID scanners 107 may take the form of gateway beacons which provide a gateway to the surface visibility module 2006, the PIV dispatch management module 2000 and the PIV data analysis module 2002 via an Ethernet or fiber optic network. Also, in some embodiments, the network may be a private dedicated network that is separate from a larger WAN environment.

The RFID reader 107 may receive radio frequencies from either active or passive RFID tags that may be placed on PIVs 116, trailers 104, or items of cargo. The RFID readers 107 query RFID tags in order to obtain identification, location, and other information about the PIVs, trailers, or cargo devices carrying the tags. FIG. 3 illustrates how a plurality of locations may be distributed throughout the facility 100. As is apparent from the diagram, PIVs 116 may travel throughout the facility from location to location and may return to a loading dock 102 to pick up additional cargo for transport to another location in the facility 100.

Figure 4:
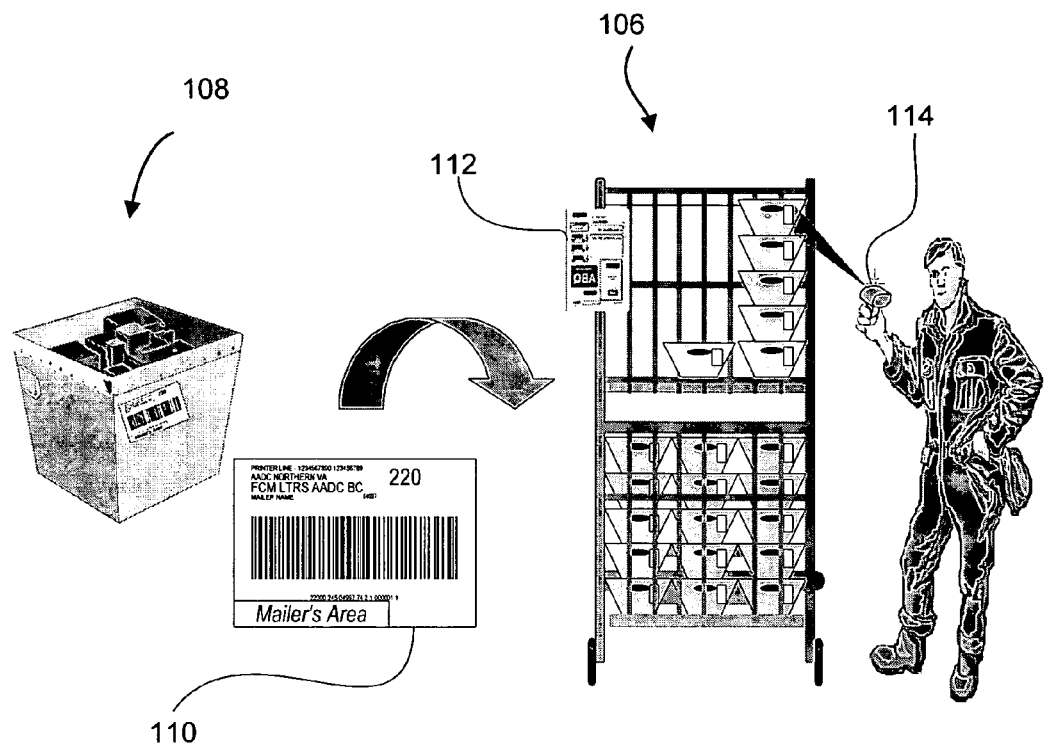
FIG. 4 is a perspective view of various items that may be carried by PIVs throughout a facility.

Referring now to FIG. 4, an exemplary embodiment of cargo that may be transported within facility 100 is shown. Although in the example shown and described the cargo is related to postal operations, one of skill in the art will readily appreciate that cargo may include any material that is transported within a facility by a PIV. For example the materials may include cargo to be delivered such as parts, commercial goods, food items, or any materials that may be transported from a first location to a second location. In the illustrated embodiment, a tray 108 includes parcels of mail to be delivered to an intended destination. The tray 108 may include a barcode 110, which may provide information about the destination for the mail that is in the tray 108. For example, tray barcode 110 may include information regarding a final zip code destination for the items in the tray 108. FIG. 4 also illustrates a container 106, which may be used for storage or stacking one or more trays 108. The container 106 may be a shipping container such as that shown in FIG. 4 which allows the trays 108 to be stacked in an orderly manner. The container 106 may have a set of wheels which allows it to be rolled from a vehicle on to the loading dock 102 and into the facility 100. Alternatively, the container 106 may include skids or slots for receiving prongs from a forklift or some other PIV for transportation through the facility 100.

The containers 106 may also include a container identification barcode 112 affixed to the body of the container. The container identification barcode 112 may be used to uniquely identify the container, although not necessarily the contents or materials transported in the container. Alternatively, the container identification barcode may also include information related to the contents of the container 106. The container identification barcode 112 and the tray barcode 110 may each be scanned by a barcode scanner 114 which may read the barcodes and store these values in a memory or transmit the values for storage in a database.

Figure 5:
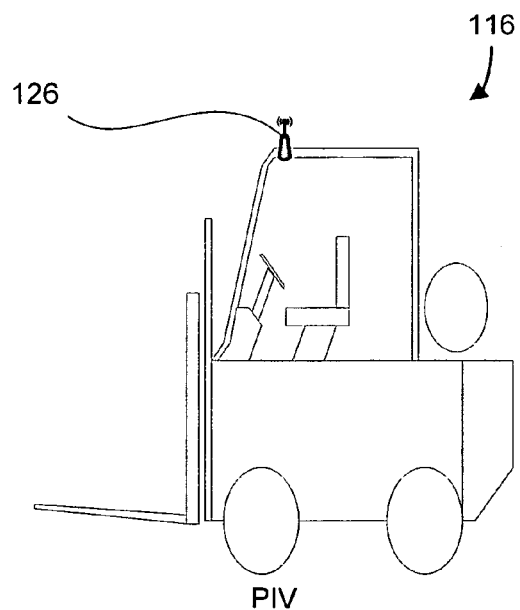
FIG. 5 is a side elevation view of a PIV.

Referring now to FIG. 5, an example of a powered industrial vehicle (PIV) 116 is provided. PIV 116 may be any number of different types of vehicles, including forklifts, motorized carts, or any other vehicle that can be used to transport cargo or other materials within the facility 100. A PIV 116 may include a wireless transceiver 126 configured to send and receive data wirelessly. Wireless transceiver 126 may take the form of an RFID receiver, or it may work in conjunction with an RFID tag placed on the PIV 116 to transmit identifying information. The RFID receiver may also be a transponder/transceiver device. The RFID tag/receiver allows the wireless transceiver 126 to transmit the location of the PIV 116 over a network. In other embodiments, wireless transceiver 126 may be a GPS transmitter/receiver, or a GSM cellular transmitter or receiver which may be used to pinpoint a location of the PIV 116 and report the location by sending a text message over a mobile phone network.

Figure 6:
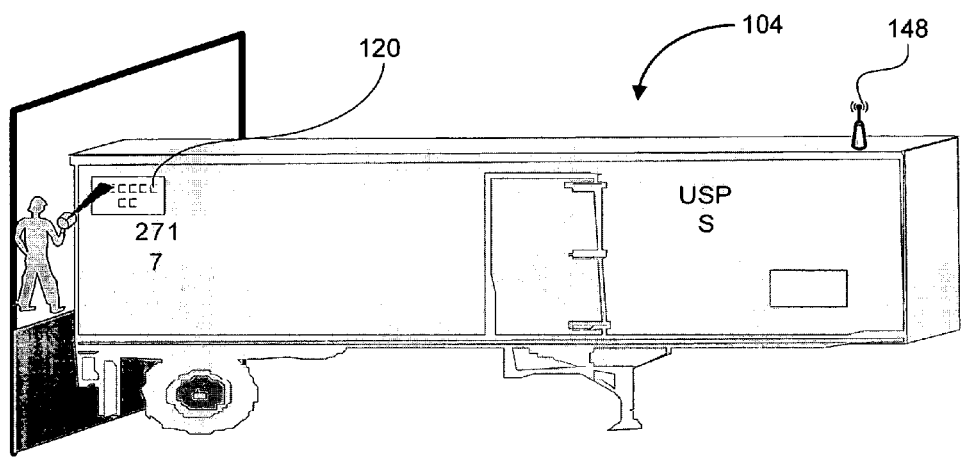
FIG. 6 is a detailed side view of a trailer which may deliver cargo to a loading dock according to aspects of the invention.

Referring now to FIG. 6, a more detailed example of a trailer 104 is provided. Trailer 104 may include a trailer identification barcode 120 located, for example, on its outer surface at eye-level so that it may be scanned by a detector such as scanner 114. The trailer identification barcode 120 may be used to uniquely identify the trailer 104 when scanned by the scanner 114. The trailer identification barcode 120 may be scanned by the scanner 114 upon arrival or dispatch at loading dock 102 so that the system can insure accurate and timely loading and unloading of the trailer 104. The trailer 104 may also include a GPS receiver 148, which is configured to be used in conjunction with a global positional system to track the location of the trailer 104.

Figure 7:
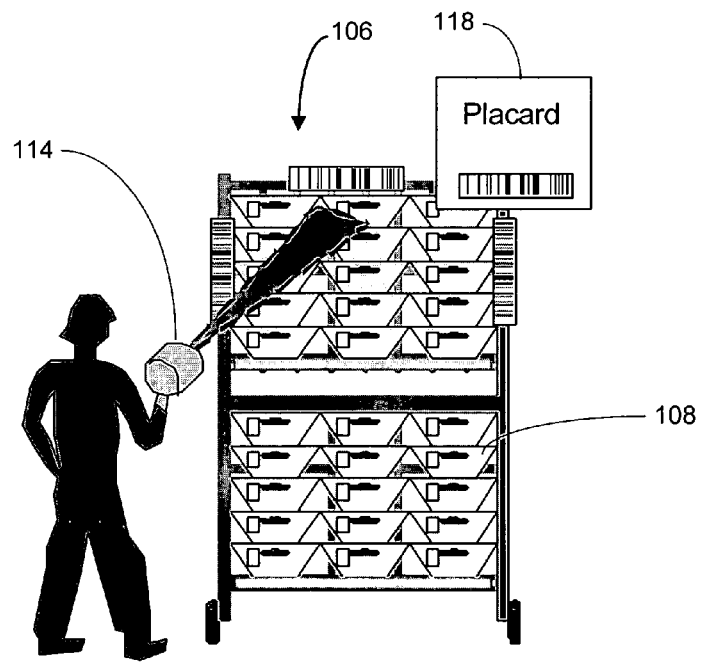
FIG. 7 is a front view of a barcoded container loaded with barcoded trays according to one or more aspects of the invention.

FIG. 7 is a more detailed view of a container 106. In the example provided, the container 106 is loaded with thirty trays 108 and each of the trays includes a tray barcode 110 located, for example, on its exterior shell where it can be easily scanned by the scanner 114. The barcode 110 includes information associated with the destination of the tray 108. This information may include an identifier which can be associated with data stored in a database which is related to the identifier. For example, the scanner 114 may scan the barcode and from that scan receive the identifier. The identifier may be sent by the scanner to a database which stores additional information about the tray 108, such as the destination zip code for the cargo in the tray, or the tray's next delivery location 140 within the facility 100. The database may be stored on the scanner 114 in a storage area, or it may be stored remotely, accessible to the scanner 114 via the network 130.

The container 106 may also include a container identification barcode 112 located on an exterior portion of the container 106 and not shown in FIG. 7. Locating the container identification barcode on the exterior portion of the container 106 allows the barcode to be scanned without difficulty. The container identification barcode 112 may be used to uniquely identify the container much in the same way that a license plate may identify an automobile. In addition to the container identification barcode 112, the container may also include a second barcode, the container destination barcode 119, which may be placed on the container 106 by attaching a removable placard 118 to the outer surface of the container 106.

The container destination barcode 119 may include information which can be used to identify the destination and the routing information for the container 106. In one embodiment, the routing information may be predetermined based on the destination information. For example, if the destination of the container is a location 140 in the facility 100, the routing information may be based on a predefined route from the loading dock to the location that is stored either in the scanner 114 or in a database accessible via the network 130. Alternatively, if the destination is another facility, the routing information may be derived from a mapping table which stores shipping routes between various facilities. When a container 106 reaches a new location, a user of a handheld scanner 114 may scan the container identification barcode 112 and then scan the container destination barcode 119 to associate the container 106 with its new location.

Because the placard 118 is removable, when the container reaches the destination indicated by the container destination barcode 119, the placard 118 may be removed and replaced with another placard 118. The new placard 118 may have a new container destination barcode 119 which may then be scanned and associated with the container identification barcode 112.

In some embodiments, the various barcodes described above may also include RFID tags embedded or associated with the barcodes. By including RFID tags that are associated with the barcodes, the RFID scanners 107 or gateway beacons located throughout the facility 100 may read the RFID tags, and based on the location of the scanner reading the tag, determine the location of the barcode and its associated cargo.

Figure 8:
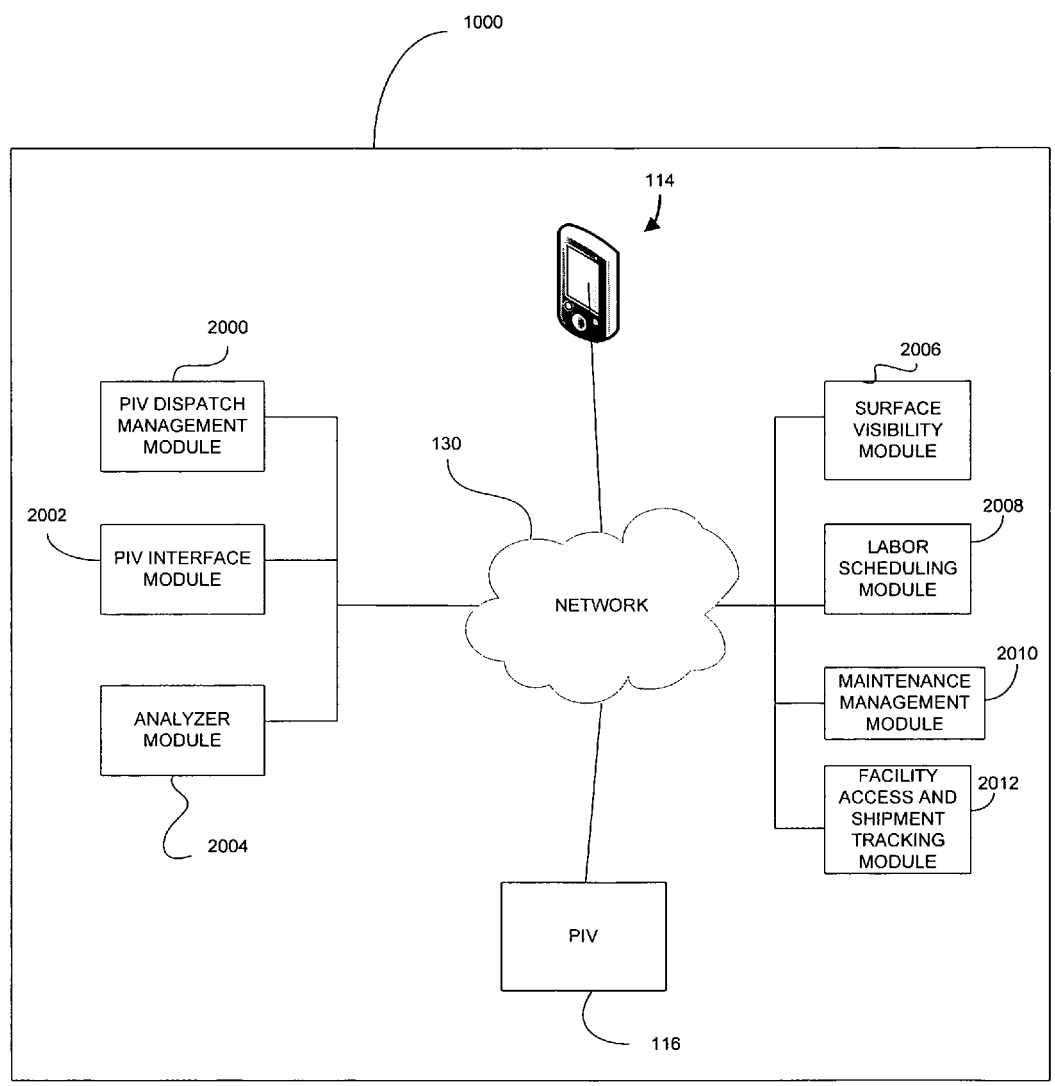
FIG. 8 is a block diagram of a PIV facility management system in accordance with aspects of the invention.

FIG. 8 is a block diagram of a PIV facility management system 1000 that may be implemented in a network according to one or more aspects of the invention. The details of various exemplary components of the network 130 shown in FIG. 8 will be described below with reference to FIGS. 10-16. Various system components of the management system 1000 may be in communication with each other via a computer network 130. The computer network 130 may be any of a number of different types of computer networks such as a local area network (LAN), a wide area network (WAN), an ATM network, an ISDN network, a token ring network, an intranet/extranet, or some other network environment. The computer network 130 may include a series of routers, hubs, access points, or other components for sending and receiving data across the network from one component to the next. Various computer systems may be connected to the computer network 130. These connections may be wired connections, wireless connections, or a combination of both.

In one embodiment, a PIV 116 may include a wireless transceiver 126 that connects wirelessly to the computer network 130. Similarly, the barcode scanners 114 may also connect wirelessly with network 130 to share data with other devices connected to the network. Through this wireless network connection, the barcode scanners 114 may be configured to scan barcodes at the loading dock 102 and other areas of the warehouse facility 100 and quickly send scanned data to other system components.

Also connected to the network 130 are various other computer systems examples of which will be described in greater detail below. These components include a PIV dispatch management module 2000 which manages dispatch of PIVs to warehouse locations 140 and a PIV interface module, which provides PIV-specific data to the network. Also connected to network 130 is a PIV data analysis module 2004, which performs predictive analysis of data supplied by various other system components. The network 130 may also send/receive data from a surface visibility module 2006 which may be used to track materials such as containers 106, trailers 104, and trays 108, as they arrive at the facility 100 and are transported through various locations within the facility. The network 130 may also be connected to a labor scheduling tool 2008 which may be used to schedule shifts for PIV operators based on manpower needs. The network 130 may also include a PIV maintenance management module 2010 which may be used to schedule both preventative and unanticipated maintenance for the PIVs 116. The PIV facility management system 1000 may also include a facility access and shipment tracking module 2012 which may be used to track irregular or large shipments into the facility 100. In an embodiment where the facility is a mail processing facility, the facility access and shipment tracking module 2012 may be used to track incoming bulk mail shipments that are typically comprised of cargo from a single sender, such as magazines or catalogs.

Additional system components may also be connected to the network 130, and one of skill in the art will appreciate that the various components described herein may be embodied in various hardware and software configurations without departing from the scope and sprit of the invention disclosed herein. For example, in one embodiment, each module described above may be a separate server configured to perform specialized functions. In other embodiments, various modules may be combined into a single server system. Moreover, one of skill in the art will also appreciate that data may be shared among these various systems by way of any number of common data formats such as XML, EDI, or some other data format so long as it is machine readable by both the sending and receiving device.

Figure 9A:
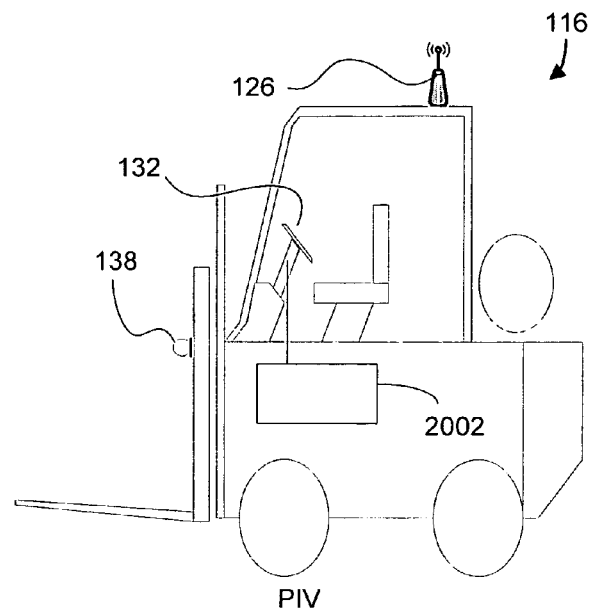
FIG. 9 is detailed view of a PIV, including a block diagram of an operator interface for use in accordance with aspects of the invention.

As shown in FIG. 9A, the PIV 116 may be connected to the network 130 by way of a wireless transceiver 126. In one embodiment, a PIV 116 may include an interface module 2002. The interface module 2002 may be a computing device such as a mobile computer placed in the PIV 116 which is configured to communicate with a network 130 and via the wireless transceiver 126. The interface module 2002 may include a storage device or memory for storing data about the PIV. The storage device on the interface module 2002 may store data including measurements by various sensors 138 that may be installed on the PIV 116. By way of example, PIV 116 may include an odometric sensor that measure distances traveled by the PIV. The PIV 116 may also have various weight sensors that may work in conjunction with the odometric sensor. The weight sensors may measure the weight of cargo carried by the PIV at a given time or for a given distance. Some PIVs may have both lifting capacity and towing capacity due to having a forklift apparatus on the front and a towing apparatus on the rear, for example. These dual-capable PIVs 116 may include multiple weight sensors in order to measure both the weight borne by the forklift, and the weight towed by the towing apparatus. Together, the odometric sensors and the weight sensors may determine the distance traveled by the PIV while carrying cargo and while not carrying cargo. The PIV 116 may also include a speedometer to measure speed, and speed measurements may also be stored in the interface module 2002. In one embodiment, speed measurements are stored every couple of seconds so that the stored data may be analyzed for traffic pattern analysis. In other embodiments, speed measurement exceeding a certain threshold may be stored so that driver safety issues may be analyzed based on the data. The PIV may also include battery sensors which measure battery charge data and store it in the interface module 2002. PIVs 116 may also include fuel sensors which are in communication with the interface module 2002 which provide additional real-time operating data about the PIV 116.

In one embodiment, the interface module 2002 may include a user interface 132. Alternatively, the user interface 132 may be a separate component that is in electrical communication with the interface module 2002. The user interface 132 may be used by the operator of the PIV to send and receive data from the network 130 (via the network transceiver 126 or some other means). The data may include information such as cargo pickup locations, cargo destination locations, route maps, or other data. The user interface 132 may be positioned in close proximity to the operating controls of the PIV so that the operator of the PIV is able to safely interact with the user interface 132 while operating the PIV 116.

In another embodiment, the user interface 132 may be fully integrated into the operating controls of the PIV, allowing the PIV operator to control the operation of the PIV and to send and receive data communications through a single unified interface. The PIV 116 may also include additional sensors 138 which may be configured to detect collisions involving the PIV and send data about each collision to the interface module 2002, which may then send the data back to the maintenance management module 2010 via the wireless transceiver 126. Alternatively, the sensors 138 may be configured to send collision data directly to the network 130, bypassing PIV interface module 2002.

In some embodiments, the interface module 2002 may be configured to perform certain actions upon receiving notice of a collision event from the impact sensors 138. For example, the interface module 2002 may be configured to safely shut the PIVs motor off when a collision occurs. Shutting down the PIV when a collision occurs allows identification of the operator of the PIV involved in the collision in multi-operator environments. The shut down action of the interface module 2002 may be based on a threshold collision force such that minor collisions do not cause the PIV to be shut down, but major impacts are addressed. In addition, the threshold may be configured to account for different operating environments. For example, in an older facility with pot holes and other types of imperfections in the travel surface, the threshold may be set somewhat higher, so that the normal operation of the PIV does not result in a shut down event.

Figure 9B:
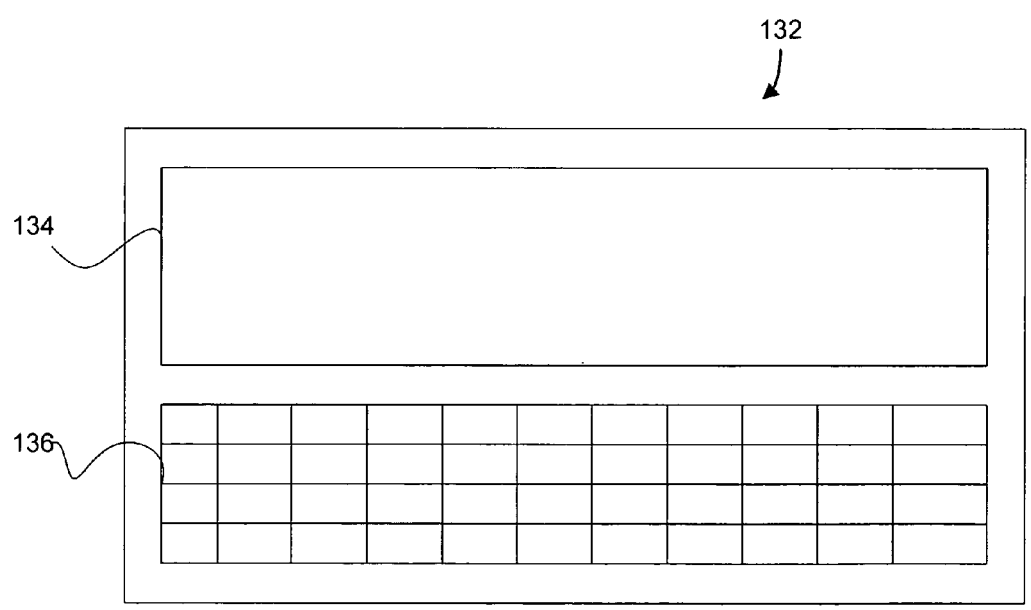

Referring now to FIG. 9B, the user interface 132 may include a display 134. The display may be any one of the number of different types of displays including an LCD display with a touch screen functionality a CRT display, or some other type of display. The display may be used to display information received in the user interface from a data source such as the network 130 via the wireless transceiver 126. The user interface 132 may also include an input device 136 such as a keypad which may be used by the PIV operator to enter data into the interface module 2002 for communication to other network components via the wireless transceiver 126. Although the input device 136 shown in FIG. 9B is a keypad, one of skill in the art will appreciate that the input device may take many different forms. For example, the input device 136 may be a touchpad, a touch screen accessible via a stylus, a microphone configured to receive voice data and work in conjunction with a voice recognition system, or some other input device such as a computer mouse or standard keyboard.

In some embodiments, the interface module 2002 may be configured to permit selective access to the operating controls of the PIV 116. By way of example and not of limitation, in one embodiment, the interface module may include a database of authorized operators for the PIV. In order for an operator to access the PIV, the operator may be required to login to the PIV via the user interface 132 and the input device 136. The operator may have user identification and a password that is entered into the system. Alternatively, the input could be a voice command, a keycard associated with the operator, or some other input.

The database of authorized operators of the PIV may be specific to the PIV on which it is stored, or it may be a more general type of database based on the model of the PIV. For example, the database may include a list of each type or model of PIV, and may include a list of authorized operators for each model. The authorization of operators of the PIV may be based on various qualifying metrics. For example, the system may require that an operator be certified by some governmental entity, such as OSHA (Occupation and Safety and Health Administration) and that the certification be current. Thus, the database may be updated regularly to account for changes in certification status.

In some embodiments, the database may be downloaded in real-time from the network 130 into the interface module 2002 when access to the PIV 116 is requested by an operator. This real-time download helps to ensure that the most up to date certification data is relied upon by the login routine. In addition, the real-time download of the data also allows the system to prevent multiple simultaneous logins by a single user. Prevention of multiple logins helps to ensure that an unauthorized operator does not use another operator's login data to access the PIV 116. Alternatively, the interface module 2002 may receive pushed updates over the network 130 from a centralized server that maintains the certification data. In one embodiment, the central server may be the PIV dispatch management module 2000. In other embodiments, the central server may include a dedicated server that connects to an external database such as a governmental certification database accessible via the Internet.

Additionally, the certification database may be configured to track accident events or collision events for each operator of the PIV. This is possible due to the sensors 138 on the PIV and the requirement that all operators login to the PIV in order to operate the PIV. Thus, in addition to requiring a government certification for logging into a particular PIV, the system may restrict access when a particular operator has been in one or more collision events. Such a configuration may provide an additional layer of safety in the operating environment. As noted above, the sensors may include a speedometer which may track speeds at which the PIV is operating. If a particular operator exceeds a speed limit within the facility, this event may be recorded, and may be used to deny authorization to operate PIVs after repeated offenses.

Figure 10:
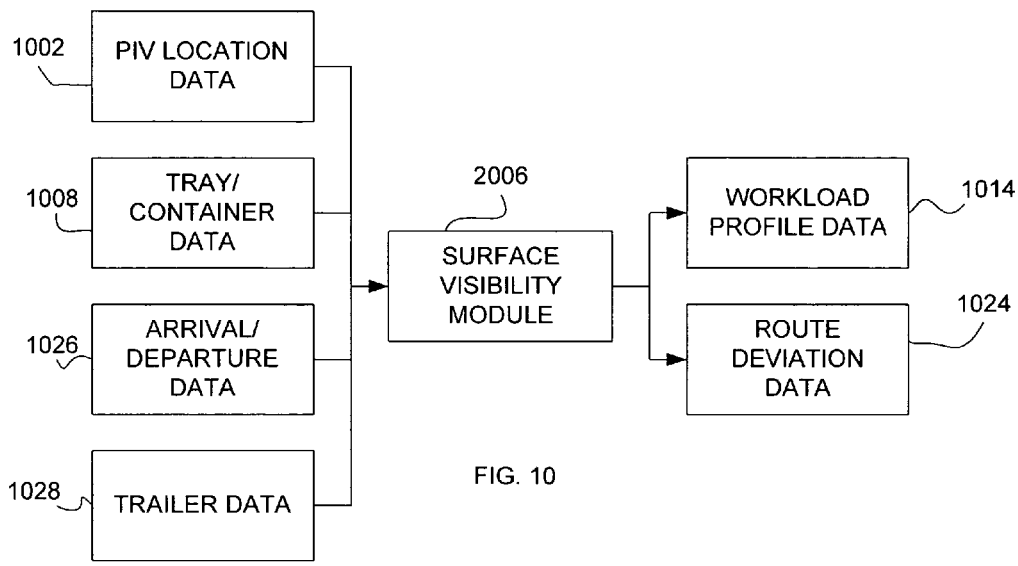
FIG. 10 is a block diagram showing various inputs and outputs to a surface visibility module according to one more embodiment of the invention.

Referring now to FIG. 10, a block diagram illustrating the data flow into and out of a surface visibility module 2006 is provided. The surface visibility module 2006 collects data by receiving scanned data about the cargo and vehicles. The surface visibility module 2006 links the data to support planning, management, and optimization of the transportation of the cargo from its original location to its final destination. In this sense, the surface visibility module 2006 is an end-to-end cargo tracking solution. The surface visibility module 2006 may be implemented as a network-enabled database management system that is configured to receive data inputs via various inputs sources. The surface visibility module 2006 may be implemented as a relational database, an object-relational database, or an objected-oriented database. Although it may store additional data, the surface visibility module 2006 may record location data for barcoded items in the facility 100, and update its database with new information each time a barcode is scanned.

The surface visibility module 2006 receives its data inputs through various means. For example, the PIV location data 2002 may be collected from the RFID tags on the PIV 116 that are read by RFID scanners located within the warehouse facility 100. The RFID scanners 107 may relay this location information to the surface visibility module 2006 where it may be stored for additional processing.

The surface visibility module 2006 also collects tray/container data 1008 via scans of container information barcodes 112, container destination barcodes 118, and tray barcodes 110 at all handoff points in their distribution channels. Although the embodiments described herein utilize barcode technology for tracking the location or cargo, one of skill in the art will appreciate that containers, trays and other items of cargo may similarly be tracked and located utilizing RFID tags and readers 107. Handoff points that are scanned into the surface visibility module 2006 may include arrival scans, departure scans, and various interim points within facility 100, such as locations 140. The surface visibility module 2006 may also receive arrival/departure data 1026 which may include information regarding the arrival and departure of trailers 104 at the loading dock 102 of the warehouse facility 100. The arrival/departure data 1026 may be captured by scanning the trailer identification barcode 120 upon arrival and departure from the loading dock 102. Alternatively, each trailer 104 may be equipped with RFID tags that are scanned by RFID scanners 107 as they come in proximity to the facility 100. The surface visibility module 2006 may also receive trailer loading data 1028. This data may include a trailer space utilization measurement based on arrival and departure scans, to determine whether it is full.

The surface visibility module 2006 may also generate data output based on the received data inputs. By way of example and not of limitation, the surface visibility module 2006 may generate workload profile data 1014 which may be sent to the PIV data analysis module 2004 where it may be analyzed to predict future volumes of incoming cargo. The workload profile data 1014 may include average incoming mail volume for certain time periods. The surface visibility module 2006 can derive this data based on the number of incoming barcode scans over time. For example, in one embodiment, the surface visibility module will generate workload profile data by querying its database to determine the average incoming cargo volume for each hour of the day over the course of two months. This derived data may be further refined to analyze the workload based on days of the week and hours of the day. Where the surface visibility data is stored in a relational database, the workload profile data may be extracted through the use of SQL select queries as are known in the art. Alternatively, the surface visibility module 2006 may also simply send raw data to the PIV data analysis module 2004 for analysis, as will be discussed further below.

In addition to generating workload profile data 1014, the surface visibility module may also generate route deviation data 1024 to account for changed circumstances within the warehouse facility. Route deviation data 1024 is data that alters routing information for a particular container 106 or tray 108 based on changed conditions in the facility 100 such as an early departure by trailer 104 on which the container 106 or tray 108 was to have been loaded prior to its departure. When this occurs, the surface visibility module 2006 will identify the next best destination for that particular parcel or container, and modify the data associated with its barcode accordingly.

Figure 11:
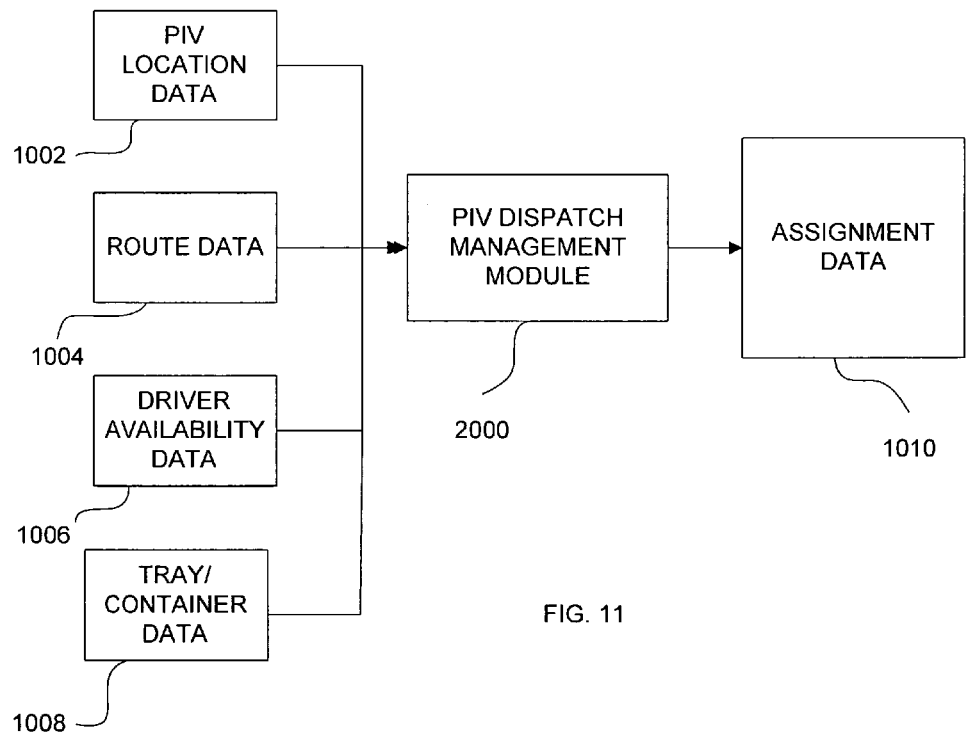
FIG. 11 is a block diagram showing the PIV dispatch management module according to aspects of the invention.

Referring now to FIG. 11, a data input/output diagram showing the data flow for PIV dispatch management module 2000 is provided. PIV dispatch management module 2000 manages the dispatch of PIVs by generating assignments, in the form of assignment data 1010, for the PIVs to pick up and deliver cargo throughout the facility 100. As used herein, an assignment includes any task given to a PIV and its operator/driver directing it to proceed to one or more locations 140 in the facility 100 to pick up and/or deliver cargo. In one embodiment, the assignment data 1010 may be stored in a relational database table of comprising a set of assignment records. The assignment records may include, for example, a beginning location, a destination location, a barcode number indicative of the materials to be included in the assignment, and possibly a PIV/operator associated with the assignment. The assignment data 1010 may be sent in the form of a notification message to a PIV 116, or more precisely, to the PIV interface module 2002 where it can be retrieved by the PIV operator through the user interface 132, and responded to accordingly.

In some embodiments, the assignment data 1010 may also include an indication of the urgency of the assignment, or it may alternatively include a deadline for delivery of the assignment. These indications may be useful in many instances. For example, if a particular assignment includes cargo that must reach a loading dock before a particular trailer 120 leaves the dock, the assignment may be flagged as urgent so that PIVs operating in the facility may act based on the urgency by dropping a current assignment in order to first complete the urgent assignment dispatch.

The PIV dispatch management module 2000 may be configured to receive various data inputs shown in FIG. 10 in order to efficiently create the assignment data 1010. In one embodiment the PIV dispatch management module 2000 generates assignment data 1010 based on input data which is received into the PIV dispatch management module 2000. The input data includes PIV location data 1002. PIV location data 1002 may provide the current location of each PIV within the facility 100. The PIV location data 1002 may be sent via the wireless transceiver 126 of each PIV 116. The PIV location data 1002 may be generated by various means including GPS technology, RFID technology, or some other locating device, and the data may be in the form of a set of coordinates for each PIV operating within the facility 100.

PIV dispatch management module 2000 also may receive route data 1004 which allows it to determine an appropriate route to include in each assignment record. In some embodiments, the route data 1004 may be generated from a map of the operational space layout data 1012 (discussed below) of the facility 100. The map may be generated by mapping software such as AutoCAD®, Visio®, or some other mapping software. A digital version of the space layout of the facility 100 may be included in each assignment record so that the PIV operator can use the map to traverse the facility. In other embodiments, the route data 1004 may include a series of routing instructions that indicate one or more specific routes for traveling from one location to another within the facility. In yet another embodiment, the route data 1004 may be calculated on the fly in order to account for possible PIV traffic congestion that may be present in an otherwise optimal route. In addition, route modifications may be calculated while the PIV is on route based on traffic congestion within the facility 100. Instances of PIV traffic congestion may be identified by receiving PIV location data 1002 and flagging defined areas in the facility 100 in which the number of PIVs exceeds a defined threshold. When a calculated optimal route passes through a congested area, an alternate route may be calculated and provided to avoid the congestion.

PIV dispatch management module 2000 also processes driver availability data 1006, which describes the status of PIVs and their operators, in order to generate assignment data 1010. Driver availability data 1006 may include a list of PIV operators currently on duty and available to pick up cargo. The driver availability data 1006 may be derived by first determining those operators currently on duty and operating a PIV. This information may be stored in a labor scheduling module 2008 (discussed in further detail below), or it may alternatively be stored in some electronic time-tracking or ERP software application that is known in the art. Next, the list of on-duty operators can be cross-referenced or compared to a list of operators currently dispatched to a location 140 within the warehouse facility 100. Those operators on the first list, but not on the second, may be flagged as being available for dispatch.

Driver availability data 1006 may also include next stop information for those drivers/operators that are currently dispatched on an assignment. This information may be used to identify currently dispatched operators that might be best situated for a particular assignment based on the destination location of the current assignment.

PIV dispatch management module 2000 also receives tray/container data 1008 which includes barcode and location data for trays 108 and containers 106 as they are scanned each time they arrive at a new location in the facility 100. As discussed above, the tray barcode 110 and the container destination barcode 118 may be used to determine the next location within with the facility 100 for each particular piece of cargo. The PIV dispatch management module 2000 analyzes the tray/container data, and generates assignment data 1010 based on the tray/container data 1008.

Figure 12:
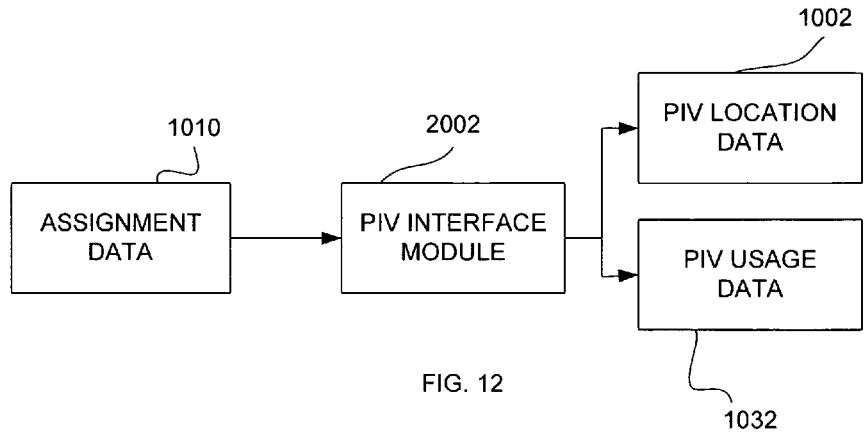
FIG. 12 is a block diagram illustrating a PIV interface module along with various inputs and outputs which may be used in accordance with aspects of the invention.

Referring now to FIG. 12, the data flow for the PIV interface module 2002 is provided. As previously discussed in connection with FIG. 11, the PIV interface module 2002 receives assignment data 1010 from the PIV dispatch management module 2000. Upon receiving the assignment data 1010, the PIV interface module 2002 displays assignment details to the operator of the PIV 116 on the display 134 of the user interface 132.

The PIV interface module 2002, in addition to receiving assignment data, may also be configured to generate and send data back to the network for processing by various other network components. This generated data includes PIV location data 1002, which may be generated at regular intervals and reported back to the PIV dispatch management module 2000 and/or to the surface visibility module 2006.

In one embodiment, the PIV location data may generated based on data provided by a GPS receiver on the PIV 116 which is in communication with the PIV interface module 2002. Alternatively, the PIV location data 1002 may be determined based on assignment data 1010. In this embodiment, the PIV interface module 2002 determines whether the PIV is currently dispatched on an assignment by examining the status of the most recent assignment data 1010 received into the PIV interface module 2002. For example, if the assignment data indicates that the PIV has picked up an assigned cargo, but has not yet delivered the cargo, the location data 1002 may be structured to indicate that the PIV 116 is located at a midpoint between the pickup location and destination location reflected in the assignment data 1010. The PIV interface module may also generate and store current tasking data which includes both the assignment being carried out by the PIV, and any future assignments that have been given to the PIV. In addition, the interface module 2002 may include driver availability data which includes certification data for the operator of the PIV and shift data for the operator which provides details about the duration of the operator's shift. This allows the system to avoid assigning a task to a PIV operator who is due to come off shift before the task is completed, which would require reassignment of the task.

PIV interface module 2002 may also generate PIV usage data 1032. PIV usage data may include operational metrics such as total distance traveled by the PIV 116, the number of operating hours, the total weight carried over time, or some other data reflecting how the PIV 116 has been used over a period of time. The PIV usage data 1032 may be captured by various instruments that may be installed in the PIV 116 and configured to communicate with the PIV interface module. For example, the distanced traveled may be measured by an odometer, and this measured distance may be communicated to the PIV interface module 2002. In addition to displaying the odometric information on the display 134, the user interface 132 of the PIV interface module 2002 may also store this information to be included with the PIV usage data 1032 that is sent. Similarly, the PIV 116 may be configured with an operating clock that records the amount of time that the PIV is operating, and this information may be communicated to the PIV interface module 2002 for storage and further processing. In some embodiments, the PIV usage data 1032 is sent over the network 130 to the maintenance management module 2010. Based on that data, the maintenance management module 2010 may be configured to schedule routine maintenance for the PIV 116, as will be discussed in greater detail below.

Figure 13:
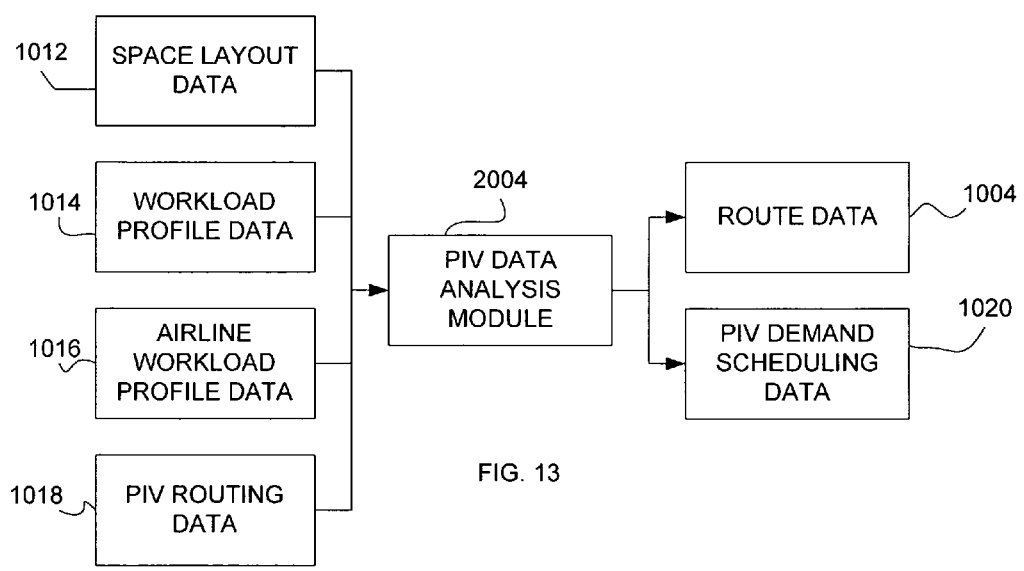
FIG. 13 it is a block diagram illustrating a PIV data analysis module which may be used in accordance with aspects of the invention.

The PIV facility management system 1000 may also include the PIV data analysis module 2004 which functions as illustrated in FIG. 13. The PIV data analysis module 2004 interfaces with various other modules in the system to provide an operational framework based on data collected from the various other subsystems and modules. This framework may be utilized by the PIV dispatch management module 2000 to manage PIVs 116 within the facility 100.

The PIV data analysis module 2004 includes various inputs from which data to be analyzed is received. In order to create the operational framework for the PIV dispatch management module 2000, the PIV data analysis module 2004 may receive operational space layout data 1012 that has been generated by a mapping tool. As noted previously in connection with FIG. 11, various software tools may be used to create the operational layout data. These tools may include some computer assisted design (CAD) software such as Visio® or AutoCAD®, or some other integrated mapping tool known in the art. Based on the available space in the facility 100, space layout data 1012 is used by the PIV data analysis module to generate specific route data 1004 to be provided to the PIV dispatch management module 2000 for use in creating assignment records which comprise the assignment data 1010 given to PIVs and their operators.

In some embodiments, the PIV data analysis module 2004 may also receive workload profile data 1014, airline workload profile data 1016, and PIV routing data 1018, which may be used to compile PIV demand scheduling data 1020. By combining and analyzing aspects of each of these data inputs, the PIV data analysis module 2004 is able to create a framework within which PIVs can be efficiently deployed. In addition, workload data may also be derived from the PIV dispatch management module 2000 and analyzed through the data analysis module 2004 to provide additional PIV routing instructions and even improved facility layout configurations using advanced affinity and workload.

Workload profile data 1014 received by the PIV data analysis module 2004 may include volume metrics of incoming cargo over time. These measurements may be provided by the surface visibility module 2006 as discussed above in connection with FIG. 10. In a mail processing environment, workload profile data 1014 may also include information regarding the shape, the class, and the type of mail received during certain time intervals. Additionally, workload profile data 1014 may also be generated by the facility access and shipment tracking module 2012 based on irregular shipments received that are not tracked through the surface visibility module due to their irregular nature.

In one embodiment, the facility access and shipment tracking module 2012 and the surface visibility module 2006 may be configured to report incoming volumes of mail to the PIV data analysis module 2004 at set time intervals. For example, each of the reporting modules may be configured to query its database to determine the amount of cargo arriving each hour. Upon completing their respective queries, the surface visibility module 2006 and the facility access and shipment tracking module 2012 may then send the query results over the network 130 to the PIV data analysis module 2004.

In addition to receiving workload profile data 1014, the PIV data analysis module 2004 may also receive airline workload profile data 1016 which may include measurements of high priority cargo brought to the facility 100 that has been designated for air shipment. In an embodiment in which the facility is a mail processing facility, the high priority cargo may include overnight mail or air-mail being sent overseas. Airline workload profile data 1016 may be tracked separately from first class or bulk mail because air mail and Express Mail may include different barcode data that requires different treatment within the warehouse facility 100.

As briefly discussed above, the PIV data analysis module 2004 may be configured to analyze the workload profile data to generate PIV demand data 1020 which includes information regarding the anticipated demand for PIV services at various times. The PIV data analysis module 2004 may use historical workload profile data to predict incoming cargo volumes. Based on these predicted incoming cargo volumes, the PIV data analysis module may create a schedule of anticipated PIV demand data 1020 to send to the labor scheduling module (as will be discussed further below). In one embodiment, the PIV demand data 1020 is a weekly schedule that indicates a minimum number of PIVs 116 necessary to accommodate the predicted incoming volume of cargo for each hour in the week. The PIV demand data 1020 may also provide an optimal number of PIVs 116 for each hour in the week. In certain industries, where seasonal demand is variable, the PIV demand data 1020 may be configured to account for this variability. By examining data reflecting incoming workload volume over several years, seasonal variations and trends can be accurately tracked and predicted.

In addition to the workload profile data, the PIV data analysis module 2004 may also receive or generate PIV routing data 1018 which may include average time measurements for dispatches from a first location 140(1) to a second location 140(2). The PIV routing data 1018 may be generated by examining pickup and delivery times entered into either the PIV dispatch management module 2000 or the surface visibility module 2006, for certain PIV delivery routes. The PIV routing data 1018 may be used by the PIV data analysis module 2004 to periodically or continuously reevaluate the route data 1004 that it provides to the PIV dispatch management module 2000, so that it may determine whether there are superior routes that can be added to the route data 1004. For example, where the route data 1004 is stored as a mapping table of routes between each location within the facility 100, the PIV routing data 1018 may be used to evaluate whether certain PIV routes are inefficient.

Various external factors may lead to route inefficiency. For example, if too many location to location routes pass through the same area of the facility 100, the traffic congestion may affect efficiency and require adjustment of some of the routes. Thus if a particular route between two locations regularly encounters delays, the PIV data analysis module 2004 may be configured to provide an improved or alternate route between the two locations by analyzing secondary route options. Moreover, changes in the space layout data 1012 may also affect the efficiency, accuracy, or even the correctness of route data 1004. When these types of changes are detected by the PIV data analysis module 2004 in the space layout data 1012, the PIV data analysis module 2004 may be configured to automatically recalculate route data 1004 and send it to the PIV dispatch management module 2000.

Figure 14:
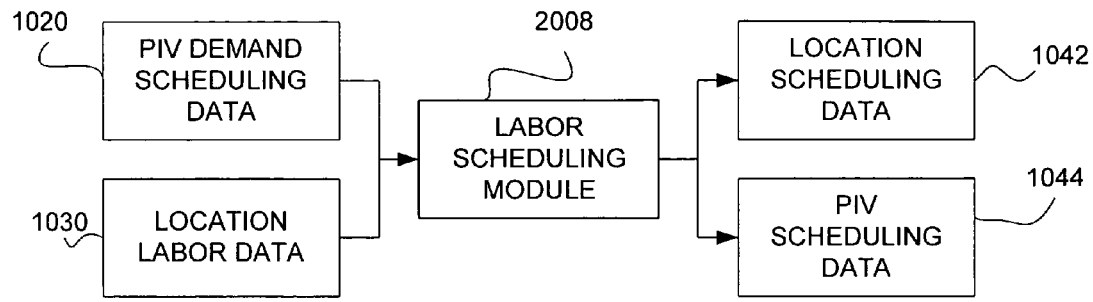
FIG. 14 is a block diagram of a labor scheduling module which may be used in accordance with aspects of the invention.

The facility management system 1000 may also include a labor scheduling module 2008 as shown in FIG. 14. The labor scheduling module 2008 is used to schedule and staff various locations in the facility 100. The labor scheduling module 2008 also schedules operators for PIVs 116. The labor scheduling module may receive and store location labor data 1030 which includes the necessary man hours to staff each location 140 in the facility 100 to achieve maximum efficiency.

Different locations in the facility will have different staffing requirements. Moreover, certain locations may have staffing requirements that differ based on the volume of cargo passing through the facility 100 at a given time. For example, in a mail processing environment, some locations 140 may consist of mail sorting machines. These machines may be staffed by two persons during normal operation. A first operator may feed mail pieces into the machine, while a second operator may manage the placement of output trays at the downstream discharge end of the mail sorting device. However, during especially busy times, an additional operator may be necessary to assist in loading the machine. The location labor data 1030 may be entered manually into the labor scheduling module 2008, or it may be received via network 130 from some other subsystem.

Based on the location labor data 1030, the labor scheduling module 2008 may generate a location labor schedule and output it as location scheduling data 1042. In generating the location scheduling data 1042, the labor scheduling module 2008 may be configured to assign operators to each location based on the number of operators needed at each location. If the placement of additional operators at a particular location will increase efficiency, then the labor scheduling module may be configured to assign extra operators based on availability. Thus, if each of the locations is at least minimally staffed, but there are operators available for scheduling, the labor scheduling module may place additional operators throughout various locations 140 in the facility 100.

The labor scheduling module 2008 may also be used to schedule and assign PIV operators to PIVs by creating PIV scheduling data 1044. The labor scheduling module receives PIV demand data 1020 from the PIV analysis module 2004. As discussed above in connection with FIG. 13, the PIV demand data 1020 may include both a minimal and an optimal staffing level. The labor scheduling module 2008 may create a PIV operator schedule for each day by first ensuring that minimal staffing requirements are met. Next, for those periods during which the minimal and optimal staffing levels are different, the labor scheduling module 2008 may, based on operator availability, schedule additional operators for PIV duty. In considering operator availability, the labor scheduling module 2008 may be provided with certain work rules to apply, such as union labor agreement rules, which may affect the availability of certain operators by limiting their available hours and requiring certain break periods during shifts.

Figure 15:
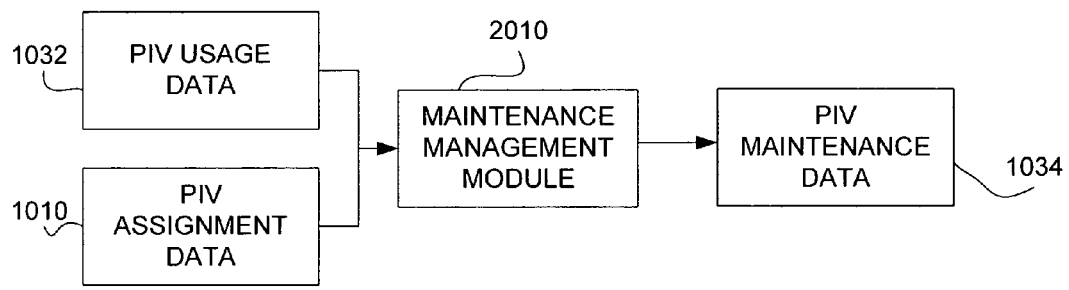
FIG. 15 is a block diagram of a PIV maintenance management tool in accordance with aspects of the invention.

Referring now to FIG. 15, a block diagram shows an example of a data input/output scheme for the maintenance management module 2010. PIVs 116 require regular maintenance to ensure that they operate reliably and safely. The maintenance management module 2010 tracks and schedules the removal of PIVs 116 from service for maintenance. Because PIVs 116 can each have differing usage patterns and routines over time, the maintenance management module 2010 may consider total usage of a PIV when scheduling maintenance. For example, if one PIV in the fleet tends to be used heavily, while another PIV in the fleet is used less frequently, the first PIV should be scheduled for routine maintenance more often then the second PIV. In order to provide such scheduling, the maintenance management module 2010 may receive PIV usage data 1032 and PIV assignment data 1010 in order to determine the appropriate schedule and then output the schedule as PIV maintenance data 1036.

As discussed above, the PIV assignment data 1010 may include a beginning location, a destination location, a PIV operator, a barcode number or some other identifying information for the materials included in the assignment, the time and date of the assignment dispatch, and possibly an operator associated with the assignment. This data may be sent to the maintenance management module 2010 as it is generated by the PIV dispatch management module 2000 and the PIV interface module 2002. The PIV usage data 1032 for each PIV 116 in the fleet may be sent at regular intervals by the PIV interface module 2002 over the network to the maintenance module. As noted above, this data will include operational data about the PIV 116 which may be captured by various sensor and other measuring devices. The operational data may include total distance traveled by the PIV 116, the number of operating hours, or some other data reflecting how the PIV 116 has been used over a period of time.

The maintenance management module 2010 receives both the PIV usage data 1032 and the PIV assignment data 1010 to determine when maintenance is required and to further determine what maintenance may be required. For example, by analyzing the PIV assignment data 1010, which may include the barcode ID of cargo picked up and delivered by the PIV 116 in each assignment, the maintenance management module can derive the total weight carried by a particular PIV 116 over time. As more weight is carried over time, required maintenance for various parts of the PIV may increase. For example, by carrying additional weight over time, the wear and tear on tires may increase, because the additional pressure placed on the tires by the heavier cargo may cause the tires to deteriorate more quickly and to develop slow leaks. Thus, by analyzing the type or weight of cargo carried by the PIV 116 over time, the maintenance management module can determine which type of inspections and preventative maintenance are required.

The maintenance management module may also schedule maintenance based on the PIV usage data 1032. The PIV 116 may require certain maintenance based on the distance that it has traveled since the last scheduled maintenance. By receiving the PIV usage data 1032 from the PIV operator interface 2002 of each PIV, the maintenance management module 2010 may create a schedule for required preventative maintenance for the entire PIV fleet in view of the differing requirements for each PIV 116. The PIV maintenance data 1034 also may include scheduled and non scheduled maintenance histories for each PIV 116. Maintaining a non-scheduled maintenance history for each PIV 116 allows the PIVs susceptible to breakdown to be identified and removed from the fleet.

The PIV maintenance data may further include a record of the battery charge status in an environment where the PIVs are powered primarily via battery or fuel cell. This information can be transmitted to the maintenance management module 2010 by configuring the interface module 2002 of each PIV 116 to transmit the information via the network 130 at a set time interval, e.g., every 20 minutes. By collecting this information in a single location, the maintenance management module 1010 can be configured to ensure that at least a minimum number of PIVs always have the required fuel or charge to be operational at all times. In another embodiment, the PIV maintenance data 1034 generated by the maintenance management module 2010 may further include scheduling data regarding the next scheduled maintenance event for the PIV 116. The generated PIV maintenance data 1036 may sent to the labor scheduling module 2008 which can use it to ensure that PIV operators scheduled to work by the labor scheduling module 2008 will have a functioning PIV 116 throughout the duration of their shift.

In embodiments where the facility 100 is a mail processing facility, postal parcels and other cargo may in some instances be of an irregular or special handling type that is treated differently than standard cargo. For example, bulk mailers such as catalog companies may bring their catalogs directly to the facility 100 for shipment as bulk mail rather than taking the bulk mail shipment to a post office. Because of the volume of mail which may be included in a delivery of this type, the party bringing the irregular delivery to the facility 100 may be required to give advance notice of the delivery to allow appropriate staffing measures to be taken.

Figure 16:
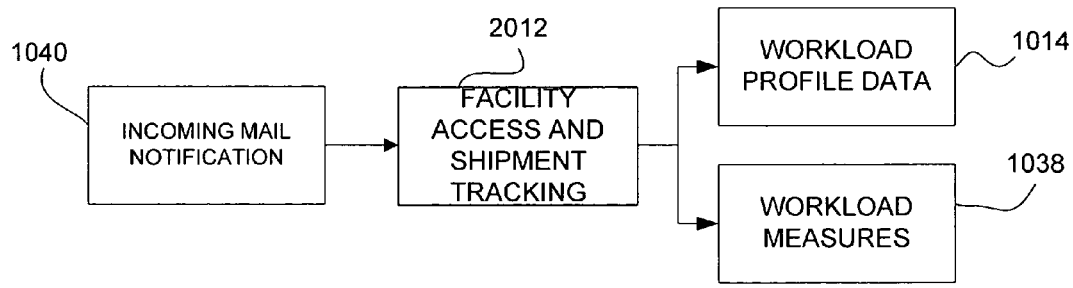
FIG. 16 provides a block diagram of a facility access to shipment tracking module that may be used in accordance with aspects of the invention.

With reference to FIG. 16, a facility access and shipment tracking module 2012 is provided which may be used to manage the process of receiving irregular cargo such as bulk mail shipments, for example. Although the facility access and shipment tracking module is described in terms view of bulk mail shipments, one of skill in the art will appreciate that various other types of irregular mail such as oversized packages, delicate or fragile packages, or other types of non-mail cargo having some irregularity may be managed similarly.

When a bulk mailer wishes to deliver a truckload of bulk mail to a facility, it sends a request to the facility access and shipment tracking module via the computer network 130. In one embodiment, this request is sent over the Internet via a secure web site in a manner known in the art. The bulk mailer may then schedule a drop-off time by submitting incoming irregular cargo notification data 1040. The irregular cargo notification data 1040 may include the drop off time, the type of cargo being dropped off, any special handling procedures necessary, and additional data relating to the nature of the shipment. Based on the data entered into the facility access and shipment tracking module 2012, workload profile data 1014 and workload measurement data 1038 are generated and sent to the PIV analysis module 2004 where it is used to create PIV demand scheduling data 1020 as described above in connection with FIG. 13.

Figure 17:
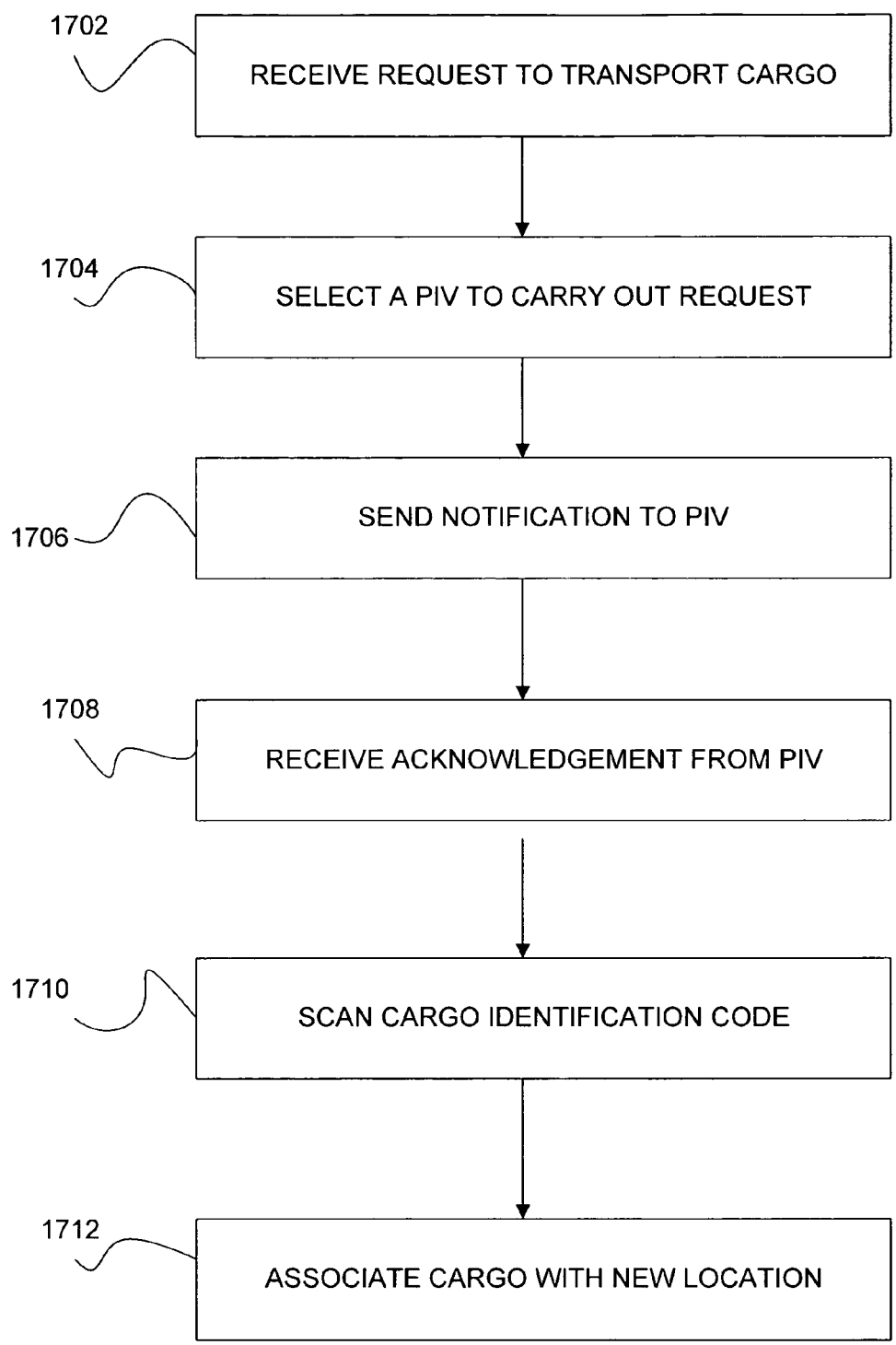
FIG. 17 is a flow chart illustrating a method for managing a fleet of PIVs in accordance with one or more embodiments of the invention.

With reference to FIG. 17, an additional embodiment of the invention provides a method of managing the use of powered industrial vehicles (PIVs) in a facility. Although the method described herein is carried out primarily in PIV dispatch management module 2000, one of skill in the art will appreciate that various system components may perform the steps described herein without departing from the scope of the invention.

At block 1702, PIV dispatch management module 2000 receives a request to transport cargo from a first location to a second location within the warehouse facility 100. As discussed above, this request may be created by the surface visibility module or it may be manually entered into the PIV dispatch management module 2000. Based on driver availability data 1006, tray/container data 1008, optimal route data 1004, and current PIV location data 1002, the PIV dispatch management module 2000 selects a PIV to carry out the request at block 1704. Next, at block 1706, the PIV dispatch management module 2000 sends a notification to the selected PIV 116 about the request. The notification may include assignment data 1010 such as cargo or container identification code, a cargo or container location, a cargo or container destination, and an optimal route. Next at block 1708, the PIV dispatch management module receives an acknowledgement from the PIV of receipt of the notification. The method then proceeds to block 1710, where the scanner 14 scans the container identification code, and associates the container with its new location at step 1712.

In yet another embodiment, the system may create on-demand routes in the facility for PIVs to carry out dispatched assignments in real-time. As noted above, there are instances where non-regular assignments become necessary in the facility. Sometimes there are available PIVs that are not in current utilization but are on "standby" which may be easily tasked to carry out the assignment. However, in some instances, all PIVs are in the field, and none are available to immediately act on the non-regular assignment.

Figure 18:
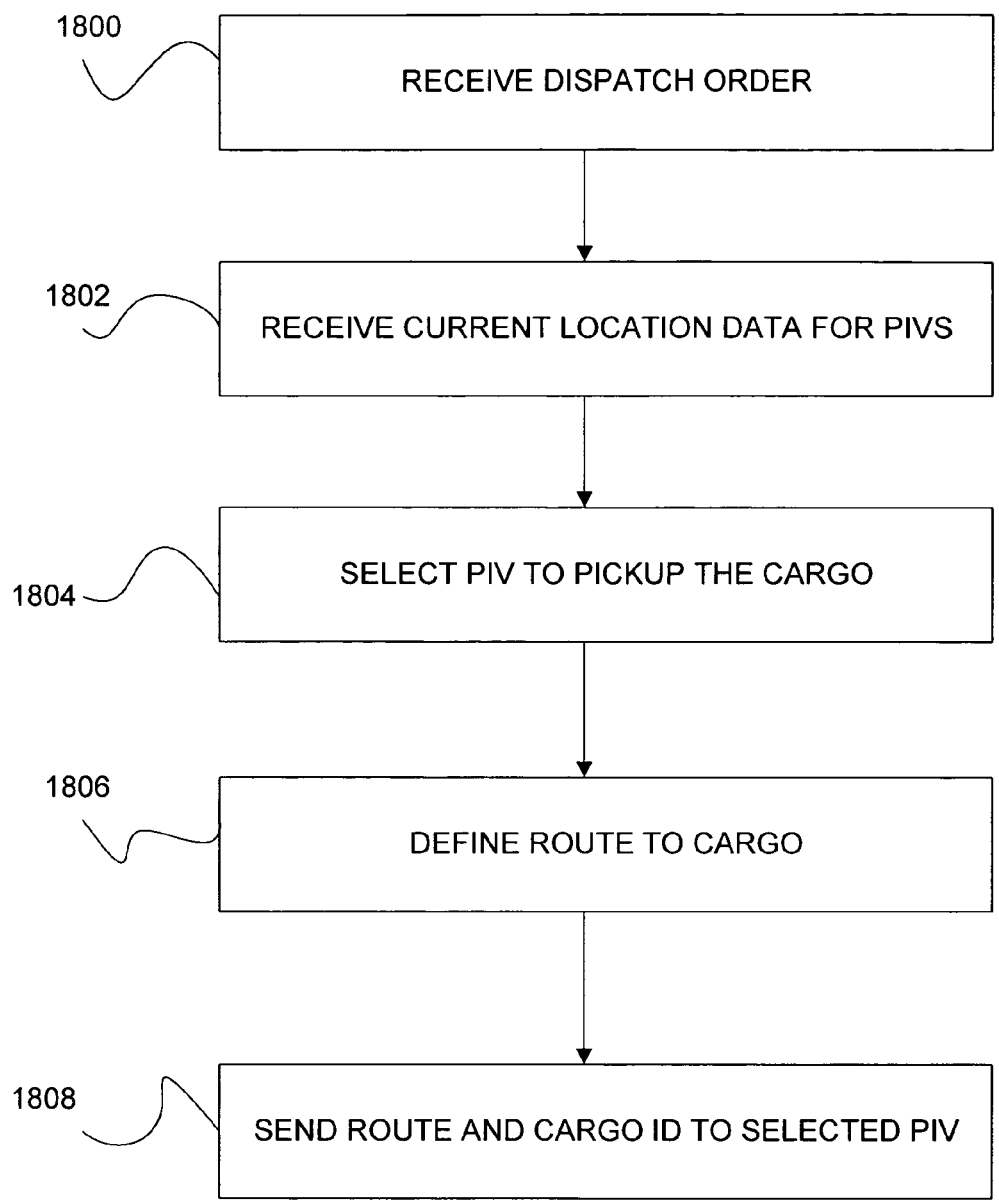
FIG. 18 is a flow chart illustrating a method for creating on-demand routes for PIVs in accordance with one or more embodiments of the invention.

FIG. 18 illustrates one embodiment of a method by which on-demand routes may be created and assigned to PIVs to carry out non-regular assignments within the facility 100 by utilizing current information about the PIVs operating in the facility in order to select an optimal PIV and an optimal route for the PIV for carrying out the task. In one embodiment, the method is primarily carried out by the PIV dispatch management module 2000. However, various combinations of the above described modules may be used to carry out the method.

At block 1800, the system receives a dispatch order for cargo. As indicated above, the dispatch order may be entered into the PIV dispatch management module 2000. The dispatch order may include, among other things, a current location of the cargo to be transported, and a delivery location within the facility 100.

Next, at block 1802, the system receives data about the PIVs 116 operating in the facility 100. This data may include various aspects about the current operating environment. For example, the received data may include current location data for the PIVs currently in operation. As described above, this data may be obtained via sensors communicating with the network via the transponder or transceiver on the PIV. The data may also include current tasking data for each PIV that indicates all of the assignments that the PIV is scheduled to carry out. The data may also include driver availability data that indicates whether the driver's shift is nearing its end, or if the driver has an upcoming break scheduled. The data may also include battery charge data measured by battery sensors 138 which provides an indication of whether the PIV has enough fuel or charge to carry out the dispatch order.

Next at block 1804, the system processes the information received in order to select a PIV to pickup the cargo. In selecting the PIV, the system may be configured to create a selection index. The selection index may include the location of the PIVs in the facility, with those PIVs situated or heading toward the pickup location being ranked higher. Current tasking data may also be included in the index, with those PIVs having tasks that will be completed near the pickup point being ranked higher than those with tasks end that far away from the pickup location. The driver availability data may be similarly included in the selection index, where PIVs with drivers coming off of their shift are ranked lower than others, or possibly are even removed from consideration. The selection index may also exclude PIVs if their battery charge data indicates insufficient power remaining to carry out the task. Once the selection index has been created and populated, the system scans the selection index. First, it eliminates those PIVs with insufficient power to carry out the task. Next, it eliminates those PIVs with drivers whose shifts end prior to the task completion time. If there is a PIV within a threshold distance of the pickup point that is untasked, that PIV is selected. If all untasked PIVs are outside of the threshold distance, the system will consider currently tasked PIVs with current task deliveries within a threshold distance of the pickup location. If the total time that it will take to complete the current task and proceed to the pickup location is less than the time it would take the best situated untasked PIV to proceed to the pickup location, the currently tasked PIV is selected. Otherwise, the currently untasked PIV is selected.

Next, at block 1806, the system defines a route for the selected PIV to proceed from its current location to the pickup location of the cargo. In one embodiment, the system utilizes the space layout data 1012 to generate a number of possible routes from the current location of the selected PIV to the current location of the cargo. These routes may be generated utilizing various methods, including general purpose commercial route definition software (such as Autocad®), or they may be generated using known techniques for solving generic vehicle routing problems that are known in the art such as a Clarke and Wright Savings Algorithm or some other routing algorithm. In determining these routes, the system examines any current tasks that the selected PIV may be required to complete prior to engaging the new dispatch. From the end point of each current task for the PIVs, the system calculates a distance for each of the possible routes. The system then selects the shortest route among the group.

Once the system has selected the PIV to carry out the dispatch, and selected the route over which the selected PIV will travel, at block 1808, the system sends the on-demand route along with the cargo identification to the interface module 2002 of the PIV. Once received by the interface module, a light may flash on the user interface, indicating to the operator of the PIV that a message is waiting to be read. In one embodiment, the actual message may not be displayed until the operator has brought the PIV to a stop. This prevents the operator of the PIV from being distracted while operating the PIV.

In still other embodiments, the on-demand route may be defined in view of the traffic flows and congestion within the facility 100. For example, when the potential routes for PIV have been identified, if the number of other PIVs operating on a given route exceed a certain threshold, then that route will not be selected due to heavy traffic congestion. This threshold may be predetermined based on the typical traffic patterns in the facility 100. In a facility where the threshold is set to 10, if the shortest route has 14 PIVs operating on it, then the system will bypass this route and analyze the next shortest route instead. If that route still has too many PIVs operating on the route, then the system will move to the next shortest route until one is found that is within the threshold. In PIV operating environments such as facility 100, the PIV traffic patterns may be very fluid. Because of this fluidity, the system defines an on demand route for a selected PIV based on traffic flows within the facility, those traffic flows may materially change before the PIV traverses the route. In yet another embodiment, the system may be configured to account for the fast-changing traffic situation within the facility by first determine the route from the current location of the selected PIV to the location of the cargo. However, the system does not immediately define the route from the pickup location of the cargo to the delivery or destination location of the cargo. Instead, the system waits until the PIV is on route to the pickup location, and then it begins to calculate the route from the pickup location of the cargo to the destination location for the cargo.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A computer-implemented method of creating on-demand routes for PIVs, the method comprising:
   receiving a dispatch order for a cargo, the dispatch order including a current location of the cargo and a destination of the cargo;
   receiving one or more of current location data, current tasking data, driver availability data, and battery charge data for PIVs operating in the facility;
   selecting, based at least in part on the received information, a first PIV to pickup the cargo;
   defining, based on the current location data of the PIVs and the current location of the selected first PIV, a first on-demand route from the current location of the selected first PIV to the current location of the cargo;
   sending, via a computer, the first on-demand route and the cargo identification to the selected first PIV;
   defining, while the selected first PIV is in transit on the first on-demand route, and based on the current location of the cargo and the current location data of the PIVs, a second on-demand route from the current location of the cargo to the destination location of the cargo; and
   sending, via a computer, the second on-demand route to the selected first PIV.

2. The computer-implemented method of claim 1, wherein the dispatch order further includes an indication of urgency of the order.

3. The computer-implemented method of claim 1, wherein the dispatch order includes a delivery deadline.

4. The computer-implemented method of claim 1, wherein the battery charge data comprises measurements from a battery voltage monitor on the PIVs.

5. The computer-implemented method of claim 1, wherein the current location data, current tasking data, driver availability data, and battery charge data for the PIVs are stored in a memory on the PIVs.

6. The computer-implemented method of claim 1, wherein defining a first on-demand route further comprises:
   determining a plurality of possible routes from the current location of the selected first PIV to the current location of the cargo; and
   calculating a distance for each of the possible routes; and
   selecting, based on the calculated distance for each possible route, a route from the current location of the selected first PIV to the current location of the cargo.

7. The computer-implemented method of claim 1, wherein defining a first on-demand route further comprises:
   determining a plurality of possible routes from the current location of the selected first PIV to the current location of the cargo;
   analyzing, based on the current location data of the PIVs, traffic flows and congestion; and
   selecting, based on the traffic flows and congestion, a route from one of the possible routes from the current location of the selected first PIV to the current location of the cargo.

8. The computer-implemented method of claim 1, wherein the driver availability data includes driver certification data and shift data.

9. The computer-implemented method of claim 1, wherein the current tasking data includes information about routes currently being traveled by the PIVs in the facility.

10. The computer-implemented method of claim 1, wherein the cargo information is a barcode value of a barcode associated with the cargo.

11. The computer-implemented method of claim 10, wherein the barcode includes an RFID tag, and the current location of the barcode is determined by reading the RFID tag.

12. The computer-implemented method of claim 2, wherein the current tasking data includes an indication of the urgency of the current task.

13. The computer-implemented method of claim 12, wherein selecting a first PIV to pickup the cargo further comprises:
   comparing the urgency of the current task to the urgency of the dispatch order; and
   selecting a first PIV based at least in part on the comparison.

14. The computer-implemented method of claim 9, wherein the information about the routes includes an anticipated arrival time at a destination location for the current route.

15. The computer-implemented method of claim 5, wherein the current location data, current tasking data, driver availability data, and battery charge data for the PIVs operating in the facility are received from the memory on the PIVs.

16. The computer-implemented method of claim 15, wherein current location data, current tasking data, driver availability data, and battery charge data are received from a wireless transponder on the PIV, the wireless transponder being in data communication with the memory on the PIV, and the wireless transponder further being polled at a substantially regular interval by one or more gateway beacons in the facility.

17. The computer-implemented method of claim 16, wherein the one or more gateway beacons are in communication with a central server through a dedicated fiber optic network.

18. The computer-implemented method of claim 7, wherein defining a second on-demand route further comprises:
   determining a plurality of possible routes from the current location of the cargo to the destination location of the cargo;
   analyzing, while the selected PIV is in route to the current location of the cargo, traffic flows between the current location of the cargo and the destination location of the cargo; and
   selecting, based on the traffic flows and congestion, a route from one of the possible routes from the current location of the cargo to the destination location of the cargo.

19. The computer-implemented method of claim 18, wherein sending the first and second on-demand routes and cargo identification to the selected PIV comprises:
   sending, to the selected PIV, the first on-demand route from the current location of the selected PIV to the current location of the cargo; and
   while the selected PIV is on route to the current location of the cargo, sending the second on demand route from the current location of the cargo to the destination location of the cargo.

20. A computer-readable medium having computer executable instructions for performing a method of creating on-demand routes for PIVs in a facility, which, when executed perform the method comprising:
   receiving a dispatch order for a cargo, the dispatch order including a current location of the cargo and a destination of the cargo;

receiving operating data, the operating data including current location data, current tasking data, driver availability data, and battery charge data for PIVs operating in the facility;

selecting, based at least in part on the current location data, the current tasking data, the driver availability data, and the battery charge data, a first PIV to pickup the cargo;

defining, based on the current location data of the PIVs and the current location of the selected first PIV, a first on-demand route from the current location of the selected first PIV to the current location of the cargo;

sending, via a computer, the first on-demand route and the cargo identification to the selected first PIV;

defining, while the selected first PIV is in transit on the fist on-demand route, and based on the current location of the cargo and the current location data of the PIVs, a second on-demand route from the current location of the cargo to the destination location of the cargo; and sending, via a computer, the second on-demand route to the selected first PIV.

21. The computer-readable medium of claim 20, wherein the dispatch order further includes an indication of urgency of the order.

22. The computer-readable medium of claim 20, wherein the dispatch order includes a delivery deadline.

23. The computer-readable medium of claim 20, wherein the battery charge data comprises measurements from a battery voltage monitor on the PIVs.

24. The computer-readable medium of claim 20, wherein the operating data for the PIVs operating in the facility is stored in a memory on the PIVs.

25. The computer-readable medium of claim 20, wherein defining a first on-demand route further comprises:
   determining a plurality of possible routes from the current location of the selected first PIV to the current location of the cargo;
   calculating, based on facility layout data, a distance for each of the possible routes; and
   selecting, based on the calculated distance for each possible route, a route from the current location of the selected first PIV to the current location of the cargo.

26. The computer-readable medium of claim 20, wherein defining a first on-demand route further comprises:
   determining a plurality of possible routes from the current location of the selected first PIV to the current location of the cargo;
   analyzing, based on the current location data of the PIVs operating in the facility, traffic flows and congestion within the facility; and
   selecting, based on the traffic flows and congestion, a route from one of the possible routes from the current location of the selected first PIV to the current location of the cargo.

27. The computer-readable medium of claim 20, wherein the driver availability data includes driver certification data and shift data.

28. The computer-readable medium of claim 20, wherein the current tasking data includes information about routes currently being traveled by the PIVs in the facility.

29. The computer-readable medium of claim 20, wherein the cargo information is a barcode value of a barcode associated with the cargo.

30. The computer-readable medium of claim 29, wherein the barcode includes an RFID tag, and the current location of the barcode is determined by reading the RFID tag.

31. The computer-readable medium of claim 21, wherein the current tasking data includes an indication of the urgency of the current task.

32. The computer-readable medium of claim 31, wherein selecting, based at least in part on the operating data, a first PIV to pickup the cargo further comprises:
   comparing the urgency of the current task to the urgency of the dispatch order; and
   selecting a first PIV based at least in part on the comparison.

33. The computer-readable medium of claim 28, wherein the information about the routes includes an anticipated arrival time at a destination location for the current route.

34. The computer-readable medium of claim 24, wherein the current location data, current tasking data, driver availability data, and battery charge data for the PIVs operating in the facility are received from the memory on the PIVs.

35. The computer-readable medium of claim 34, wherein the operating data is received from a wireless transponder on the PIV, the wireless transponder being in data communication with the memory on the PIV, and the wireless transponder further being polled at a substantially regular interval by one or more gateway beacons in the facility.

36. The computer-readable medium of claim 35, wherein the one or more gateway beacons are in communication with a central server through a dedicated fiber optic network.

37. The computer-readable medium of claim 26, wherein defining a second on-demand route further comprises:
   determining a plurality of possible routes from the current location of the cargo to the destination location of the cargo;
   analyzing, while the selected PIV is in route to the current location of the cargo, traffic flows between the current location of the cargo and the destination location of the cargo; and
   selecting, based on the traffic flows and congestion, a route from one of the possible routes from the current location of the cargo to the destination location of the cargo.

38. The computer-readable medium of claim 37, wherein sending the first and second on-demand routes and cargo identification to the selected PIV comprises:
   sending, to the selected PIV, the first on-demand route from the current location of the selected PIV to the current location of the cargo; and
   while the selected PIV is on route to the current location of the cargo, sending the second on-demand route from the current location of the cargo to the destination location of the cargo.

39. A system for creating on-demand routes for PIVs, the system comprising:
   means for receiving a dispatch order for a cargo, the dispatch order including a current location of the cargo and a destination of the cargo;
   means for receiving one or more of current location data, current tasking data, driver availability data, and battery charge data for PIVs operating in the facility;
   means for selecting, based at least in part on the received information, a first PIV to pickup the cargo;
   means for defining, based on the current location data of the PIVs and the current location of the selected first PIV, a first on-demand route from the current location of the selected first PIV to the current location of the cargo;
   means for sending, via a computer, the first on-demand route and the cargo identification to the selected first PIV;
   means for defining, while the selected first PIV is in transit on the first on-demand route, and based on the current location of the cargo and the current location data of the PIVs, a second on-demand route from the current location of the cargo to the destination location of the cargo; and means for sending, via a computer, the second on-demand route to the selected first PIV.

* * * * *